(12) United States Patent
Baghel et al.

(10) Patent No.: US 10,887,897 B2
(45) Date of Patent: Jan. 5, 2021

(54) MECHANISMS FOR SIDELINK RESOURCE SCHEDULING

(71) Applicant: QUALCOMM Incorporated, San Diego, CA (US)

(72) Inventors: Sudhir Kumar Baghel, Hillsborough, NJ (US); Zhibin Wu, Sunnyvale, CA (US); Hong Cheng, Bridgewater, NJ (US); Kapil Gulati, Dover, DE (US); Junyi Li, Chester, NJ (US); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/281,380

(22) Filed: Feb. 21, 2019

(65) Prior Publication Data

US 2019/0268918 A1 Aug. 29, 2019

Related U.S. Application Data

(60) Provisional application No. 62/635,936, filed on Feb. 27, 2018.

(51) Int. Cl.
*H04W 72/12* (2009.01)
*H04W 4/40* (2018.01)
(Continued)

(52) U.S. Cl.
CPC ......... *H04W 72/1226* (2013.01); *H04W 4/40* (2018.02); *H04W 72/0406* (2013.01);
(Continued)

(58) Field of Classification Search
None
See application file for complete search history.

(56) References Cited

U.S. PATENT DOCUMENTS

2017/0134080 A1* 5/2017 Rahman ............... H04B 7/0456
2017/0331670 A1* 11/2017 Parkvall ............... H04B 7/0695
(Continued)

FOREIGN PATENT DOCUMENTS

WO WO-2018016157 A1 * 1/2018 ............ H04L 47/24

OTHER PUBLICATIONS

Ericsson: "Sidelink Resource Allocation in V2X", 3GPP Draft; R2-162818_Sidelink Resource Allocation in V2X, 3rd Generation Partnership Project (3GPP), Mobile Competence Centre, 650, Route Des Lucioles, F-06921 Sophia-Antipolis Cedex, France, vol. RAN WG2. No. Dubrovnik, Croatia; Apr. 11, 2016-Apr. 15, 2016, Apr. 2, 2016 (Apr. 2, 2016), pp. 1-6, XP051082572, Retrieved from the Internet: URL: http://www.3gpp.org/ftp/tsg_ran/WG2_RL2/TSGR2_93bis/Docs/ [retrieved on Apr. 2, 2016].
(Continued)

*Primary Examiner* — Chi H Pham
*Assistant Examiner* — Vladislav Y Agureyev
(74) *Attorney, Agent, or Firm* — Holland & Hart LLP

(57) ABSTRACT

Methods, systems, and devices for wireless communications are described. In one example, a method includes receiving broadcast information from a base station that identifies types of resources for vehicle-based sidelink communications that are supported by the base station and transmitting a request to the base station for resource scheduling information to perform a vehicle-based sidelink communication based on the broadcast information. In some cases, the request includes an indication of a type of resources for the vehicle-based sidelink communication supported by the base station and a quality of service (QoS) metric associated with the vehicle-based sidelink communication. In some cases, the method further includes receiving, in response to the request, a response from the base station that comprises
(Continued)

the resource scheduling information to perform the vehicle-based sidelink communication.

30 Claims, 17 Drawing Sheets

(51) Int. Cl.
| | |
|---|---|
| *H04W 72/14* | (2009.01) |
| *H04W 72/04* | (2009.01) |
| H04W 76/27 | (2018.01) |
| H04W 88/02 | (2009.01) |
| H04W 88/08 | (2009.01) |
| H04W 72/10 | (2009.01) |
| H04W 88/04 | (2009.01) |

(52) U.S. Cl.
CPC ....... *H04W 72/1289* (2013.01); *H04W 72/14* (2013.01); *H04W 72/10* (2013.01); *H04W 72/1294* (2013.01); *H04W 76/27* (2018.02); *H04W 88/02* (2013.01); *H04W 88/04* (2013.01); *H04W 88/08* (2013.01)

(56) References Cited

U.S. PATENT DOCUMENTS

| | | | | |
|---|---|---|---|---|
| 2018/0049073 | A1* | 2/2018 | Dinan | H04W 72/1242 |
| 2018/0124648 | A1* | 5/2018 | Park | H04W 36/0005 |
| 2018/0279275 | A1* | 9/2018 | Chen | H04W 72/0406 |
| 2018/0324571 | A1* | 11/2018 | Buckley | H04W 12/10 |
| 2018/0332585 | A1* | 11/2018 | Faurie | H04W 72/0453 |
| 2019/0045507 | A1* | 2/2019 | Sorrentino | H04W 4/40 |
| 2019/0104450 | A1* | 4/2019 | Adachi | H04W 36/0072 |
| 2019/0116586 | A1* | 4/2019 | Basu Mallick | H04W 72/048 |
| 2019/0124015 | A1* | 4/2019 | Loehr | H04L 47/24 |
| 2019/0124489 | A1* | 4/2019 | Ahmad | H04W 4/40 |
| 2019/0124715 | A1* | 4/2019 | Chen | H04W 76/11 |
| 2019/0174530 | A1* | 6/2019 | Kim | H04W 72/1289 |
| 2019/0182639 | A1* | 6/2019 | Basu Mallick | H04W 4/40 |
| 2019/0239112 | A1* | 8/2019 | Rao | H04W 4/40 |
| 2019/0246420 | A1* | 8/2019 | Park | H04W 72/0433 |
| 2019/0246421 | A1* | 8/2019 | Zhou | H04L 5/0048 |
| 2019/0268920 | A1* | 8/2019 | Falahati | H04W 72/0406 |
| 2019/0313375 | A1* | 10/2019 | Loehr | H04W 72/10 |
| 2019/0320467 | A1* | 10/2019 | Freda | H04L 5/0055 |
| 2019/0364492 | A1* | 11/2019 | Azizi | H04W 4/029 |
| 2019/0387383 | A1* | 12/2019 | Ye | H04L 1/1671 |
| 2020/0084669 | A1* | 3/2020 | Belleschi | H04W 28/0278 |
| 2020/0100306 | A1* | 3/2020 | Ayaz | H04W 76/14 |

OTHER PUBLICATIONS

Huawei., et al., "Summary of Remaining Issues on Bandwidth Part and Wideband Operation", 3GPP Draft; R1-1801347, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 26, 2018-Mar. 2, 2018, Feb. 17, 2018 (Feb. 17, 2018), 13 Pages, XP051397511, Retrieved from the Internet: URL: http://www.3gpp.org/ftp/tsg_ran/WG1_RL1/TSGR1_92/Docs/ [retrieved on Feb. 17, 2018].

International Search Report and Written Opinion—PCT/US2019/019124—ISA/EPO—dated Apr. 25, 2019.

ZTE: "QoS Aspects for PC5-Based V2V Transport", 3GPP Draft; R2-165279_QOS Aspects for PC5-Based V2V Transport, 3rd Generation Partnership Project (3GPP), Mobile Competence Centre, 650, Route Des Lucioles, F-06921 Sophia-Antipolis Cedex, France, vol. RAN WG2. No. Göteborg; Aug. 22, 2016-Aug. 26, 2016, Aug. 21, 2016 (Aug. 21, 2016), 3 Pages, XP051140947, Retrieved from the Internet: URL: http://www.3gpp.org/ftp/Meetings_3GPP_SYNC/RAN2/Docs/ [retrieved on Aug. 21, 2016].

* cited by examiner

MECHANISMS FOR SIDELINK RESOURCE SCHEDULING

The present application for patent claims the benefit of U.S. Provisional Patent Application No. 62/635,936 by BAGHEL et al., entitled "MECHANISMS FOR SIDELINK RESOURCE SCHEDULING," filed Feb. 27, 2018, assigned to the assignee hereof, and expressly incorporated herein.

BACKGROUND

The following relates generally to wireless communication, and more specifically to mechanisms for sidelink resource scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for vehicle-based communications, also referred to as vehicle-to-everything (V2X) networks, vehicle-to-vehicle (V2V) networks, and/or cellular V2X (C-V2X) networks. Vehicle-based communication networks may provide always-on telematics where UEs (e.g., vehicle UEs (v-UEs)) communicate directly to the network (V2N), to pedestrian UEs (V2P), to infrastructure devices (V2I), and to other v-UEs (e.g., via the network and/or directly). The vehicle-based communication networks may support a safe, always-connected driving experience by providing intelligent connectivity where traffic signal timing, real-time traffic and routing, safety alerts to pedestrians/bicyclists, collision avoidance information, etc., are exchanged. However, conventional wireless communication systems may not be configured to schedule resources for sidelink communications using both LTE resources and NR resources.

SUMMARY

The described techniques relate to improved methods, systems, devices, or apparatuses that support mechanisms for sidelink resource scheduling. Generally, the described techniques provide for a wireless communications system supporting Long Term Evolution (LTE) resources as well as New Radio (NR) resources for vehicle-based sidelink communications.

During a first phase, a base station may establish a connection with a user equipment (UE) and may provide resource scheduling information to the UE. In some cases, the base station may transmit broadcast information that identifies types of resources for vehicle-based sidelink communications that are supported by the base station. In some examples, upon receiving the broadcast information, the UE may transmit a request for resource scheduling information. In some examples, the UE may transmit a request for resource scheduling information based on the broadcast information. In some cases, the request may include an indication of a type of resources for the vehicle-based sidelink communication supported by the base station and a quality of service (QoS) metric associated with the vehicle-based sidelink communication. For example, the type of resources may include LTE resources, NR resources, or both. Upon receiving the request, the base station may transmit a response that includes the resource scheduling information to perform the vehicle-based sidelink communication. In some examples, the response may be a one-time configuration signal for resource scheduling.

During a second phase, the UE may determine upcoming sidelink traffic in a buffer. Based on the determined data for the upcoming sidelink communication, the UE may request one or more grants to perform the sidelink communication. In some examples, the UE may transmit a second request for at least one grant from the base station to perform the vehicle-based sidelink communication. In some cases, the second request may be based on the received resource scheduling information. In some cases, the UE may transmit a Buffer Status Report (BSR) as part of the second request. In some cases, upon receiving the request, the base station may be configured to provide one or more grants to the UE for performing sidelink communications. In some cases, the base station may transmit a second response indicating at least one grant allocated on a set of carrier frequencies based on the type of resources indicated in the request. In some examples, the base station may be configured to allocate the physical resources using Physical Downlink Control Channel (PDCCH) signaling and a Downlink Control Indicator (DCI). Upon receiving the grants from the base station, the UE may be configured to decode the grants and perform vehicle-based sidelink communications.

A method of wireless communication is described. The method may include receiving broadcast information from a base station that identifies types of resources for vehicle-based sidelink communications that are supported by the base station, transmitting a request to the base station for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and receiving, in response to the request, a response from the base station that includes the resource scheduling information to perform the vehicle-based sidelink communication.

An apparatus for wireless communication is described. The apparatus may include means for receiving broadcast information from a base station that identifies types of resources for vehicle-based sidelink communications that are supported by the base station, means for transmitting a request to the base station for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and means for receiving, in response to the request, a response from the base station that includes the resource scheduling information to perform the vehicle-based sidelink communication.

Another apparatus for wireless communication is described. The apparatus may include a processor, memory in electronic communication with the processor, and instructions stored in the memory. The instructions may be operable to cause the processor to receive broadcast information from a base station that identifies types of resources for vehicle-based sidelink communications that are supported by the base station, transmit a request to the base station for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and receive, in response to the request, a response from the base station that includes the resource scheduling information to perform the vehicle-based sidelink communication.

A non-transitory computer-readable medium for wireless communication is described. The non-transitory computer-readable medium may include instructions operable to cause a processor to receive broadcast information from a base station that identifies types of resources for vehicle-based sidelink communications that are supported by the base station, transmit a request to the base station for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and receive, in response to the request, a response from the base station that includes the resource scheduling information to perform the vehicle-based sidelink communication.

Some examples of the method, apparatus, and non-transitory computer-readable medium described above may further include processes, features, means, or instructions for determining a logical channel ID (LCID) based on the received response. Some examples of the method, apparatus, and non-transitory computer-readable medium described above may further include processes, features, means, or instructions for identifying a mapping between the LCID and the requested QoS metric. Some examples of the method, apparatus, and non-transitory computer-readable medium described above may further include processes, features, means, or instructions for determining whether the requested QoS metric may be accepted by the base station based on the mapping.

Some examples of the method, apparatus, and non-transitory computer-readable medium described above may further include processes, features, means, or instructions for transmitting a second request for at least one grant from the base station to perform the vehicle-based sidelink communication based on the received resource scheduling information. Some examples of the method, apparatus, and non-transitory computer-readable medium described above may further include processes, features, means, or instructions for receiving a second response indicating the at least one grant allocated on a set of carrier frequencies from the base station based on the type of resources indicated in the request.

Some examples of the method, apparatus, and non-transitory computer-readable medium described above may further include processes, features, means, or instructions for transmitting a BSR to the base station.

Some examples of the method, apparatus, and non-transitory computer-readable medium described above may further include processes, features, means, or instructions for determining an LCID based on a mapping associated with the requested QoS metric. In some cases, the mapping may be indicated in the response. Some examples of the method, apparatus, and non-transitory computer-readable medium described above may further include processes, features, means, or instructions for including the LCID in the second request for the at least one grant.

Some examples of the method, apparatus, and non-transitory computer-readable medium described above may further include processes, features, means, or instructions for receiving the at least one grant based on receiving a DCI.

Some examples of the method, apparatus, and non-transitory computer-readable medium described above may further include processes, features, means, or instructions for determining whether the at least one grant may be allocated using LTE resources, NR resources, or both, based on a bit included in the DCI.

Some examples of the method, apparatus, and non-transitory computer-readable medium described above may further include processes, features, means, or instructions for determining a scrambling identifier associated with the vehicle-based sidelink communication based on the response. Some examples of the method, apparatus, and non-transitory computer-readable medium described above may further include processes, features, means, or instructions for identifying the at least one grant to perform the vehicle-based sidelink communication based on determining that the at least one grant is scrambled using the scrambling identifier.

Some examples of the method, apparatus, and non-transitory computer-readable medium described above may further include processes, features, means, or instructions for determining a location indicator associated with the vehicle-based sidelink communication based on the response. Some examples of the method, apparatus, and non-transitory computer-readable medium described above may further include processes, features, means, or instructions for identifying a location of the at least one grant based on the location indicator. In some cases, the location of the at least one grant may be identified in relation to a second grant associated with a downlink communication.

In some examples of the method, apparatus, and non-transitory computer-readable medium described above, the second response includes a timing associated with the at least one grant, a frequency associated with the at least one grant, a Bandwidth Part (BWP) associated with the at least one grant, a Modulation and Coding Scheme (MCS), a Carrier Indicator Field (CIF), or a combination thereof.

In some examples of the method, apparatus, and non-transitory computer-readable medium described above, the response includes information related to a BWP associated with the vehicle-based sidelink communication, decoding information for the vehicle-based sidelink communication, a location of at least a grant associated with the vehicle-based sidelink communication, a scrambling identifier associated with the vehicle-based sidelink communication, one or more mappings associated with the requested QoS metric, or a combination thereof.

In some examples of the method, apparatus, and non-transitory computer-readable medium described above, the decoding information for the vehicle-based sidelink communication includes a Control Resource Set (CORESET) information.

In some examples of the method, apparatus, and non-transitory computer-readable medium described above, the one or more mappings associated with the requested QoS metric include at least one of a first mapping between LCID and the requested QoS metric and a second mapping between the LCID and a logical channel group (LCG) ID.

In some examples of the method, apparatus, and non-transitory computer-readable medium described above, the types of resources include LTE resources, NR resources or both.

In some examples of the method, apparatus, and non-transitory computer-readable medium described above, the request may be included in a sidelink information message to the base station. In some examples of the method, apparatus, and non-transitory computer-readable medium described above, the request may be included in an assistance information message to the base station.

In some examples of the method, apparatus, and non-transitory computer-readable medium described above, the request may be a radio resource control (RRC) message. In some examples of the method, apparatus, and non-transitory computer-readable medium described above, the response may be an RRC message.

A method of wireless communication is described. The method may include transmitting broadcast information to a UE that identifies types of resources for vehicle-based sidelink communications that are supported by the base station, receiving a request from the UE for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and transmitting to the UE, in response to the request, a response that includes the resource scheduling information to perform the vehicle-based sidelink communication.

An apparatus for wireless communication is described. The apparatus may include means for transmitting broadcast information to a UE that identifies types of resources for vehicle-based sidelink communications that are supported by the base station, means for receiving a request from the UE for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and means for transmitting to the UE, in response to the request, a response that includes the resource scheduling information to perform the vehicle-based sidelink communication.

Another apparatus for wireless communication is described. The apparatus may include a processor, memory in electronic communication with the processor, and instructions stored in the memory. The instructions may be operable to cause the processor to transmit broadcast information to a UE that identifies types of resources for vehicle-based sidelink communications that are supported by the base station, receive a request from the UE for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and transmit to the UE, in response to the request, a response that includes the resource scheduling information to perform the vehicle-based sidelink communication.

A non-transitory computer-readable medium for wireless communication is described. The non-transitory computer-readable medium may include instructions operable to cause a processor to transmit broadcast information to a UE that identifies types of resources for vehicle-based sidelink communications that are supported by the base station, receive a request from the UE for resource scheduling information to perform a vehicle-based sidelink communication based on the broadcast information, the request including an indication of a type of resources for the vehicle-based sidelink communication supported by the base station and a QoS metric associated with the vehicle-based sidelink communication, and transmit to the UE, in response to the request, a response that includes the resource scheduling information to perform the vehicle-based sidelink communication.

Some examples of the method, apparatus, and non-transitory computer-readable medium described above may further include processes, features, means, or instructions for determining a mapping between an LCID and the requested QoS metric. In some cases, the response further includes an indication of the mapping.

Some examples of the method, apparatus, and non-transitory computer-readable medium described above may further include processes, features, means, or instructions for receiving from the UE, a second request for at least one grant to perform the vehicle-based sidelink communication based on the received resource scheduling information. Some examples of the method, apparatus, and non-transitory computer-readable medium described above may further include processes, features, means, or instructions for transmitting a second response indicating the at least one grant allocated on a set of carrier frequencies based on the type of resources indicated in the request.

Some examples of the method, apparatus, and non-transitory computer-readable medium described above may further include processes, features, means, or instructions for receiving a BSR.

Some examples of the method, apparatus, and non-transitory computer-readable medium described above may further include processes, features, means, or instructions for receiving an LCID in the second request. In some cases, the LCID may be based on a mapping associated with the requested QoS metric indicated in the response.

Some examples of the method, apparatus, and non-transitory computer-readable medium described above may further include processes, features, means, or instructions for transmitting the at least one grant based on transmitting a DCI.

Some examples of the method, apparatus, and non-transitory computer-readable medium described above may further include processes, features, means, or instructions for indicating whether the at least one grant may be allocated using LTE resources, NR resources, or both, based on a bit included in the DCI.

Some examples of the method, apparatus, and non-transitory computer-readable medium described above may further include processes, features, means, or instructions for indicating in the response, a scrambling identifier associated with the vehicle-based sidelink communication. Some examples of the method, apparatus, and non-transitory computer-readable medium described above may further include processes, features, means, or instructions for scrambling the at least one grant to perform the vehicle-based sidelink communication using the scrambling identifier.

Some examples of the method, apparatus, and non-transitory computer-readable medium described above may further include processes, features, means, or instructions for indicating in the response, a location indicator associated with the vehicle-based sidelink communication. Some examples of the method, apparatus, and non-transitory computer-readable medium described above may further include processes, features, means, or instructions for determining a location of the at least one grant based on the location indicator. In some cases, the location of the at least one grant may be determined in relation to a second grant associated with a downlink communication.

In some examples of the method, apparatus, and non-transitory computer-readable medium described above, the second response includes a timing associated with the at least one grant, a frequency associated with the at least one grant, a BWP associated with the at least one grant, an MCS, a CIF, or a combination thereof.

In some examples of the method, apparatus, and non-transitory computer-readable medium described above, the response includes information related to a BWP associated with the vehicle-based sidelink communication, decoding information for the vehicle-based sidelink communication, a location of at least a grant associated with the vehicle-based sidelink communication, a scrambling identifier associated with the vehicle-based sidelink communication, one or more mappings associated with the requested QoS metric, or a combination thereof.

In some examples of the method, apparatus, and non-transitory computer-readable medium described above, the decoding information for the vehicle-based sidelink communication includes a CORESET information.

In some examples of the method, apparatus, and non-transitory computer-readable medium described above, the one or more mappings associated with the requested QoS metric include at least one of a first mapping between LCID and the requested QoS metric and a second mapping between the LCID and an LCG ID.

In some examples of the method, apparatus, and non-transitory computer-readable medium described above, the types of resources include LTE resources, NR resources or both.

In some examples of the method, apparatus, and non-transitory computer-readable medium described above, the request may be included in a sidelink information message to the base station. In some examples of the method, apparatus, and non-transitory computer-readable medium described above, the request may be included in an assistance information message to the base station.

In some examples of the method, apparatus, and non-transitory computer-readable medium described above, the request may be an RRC message. In some examples of the method, apparatus, and non-transitory computer-readable medium described above, the response may be an RRC message.

DETAILED DESCRIPTION

Figure 1:
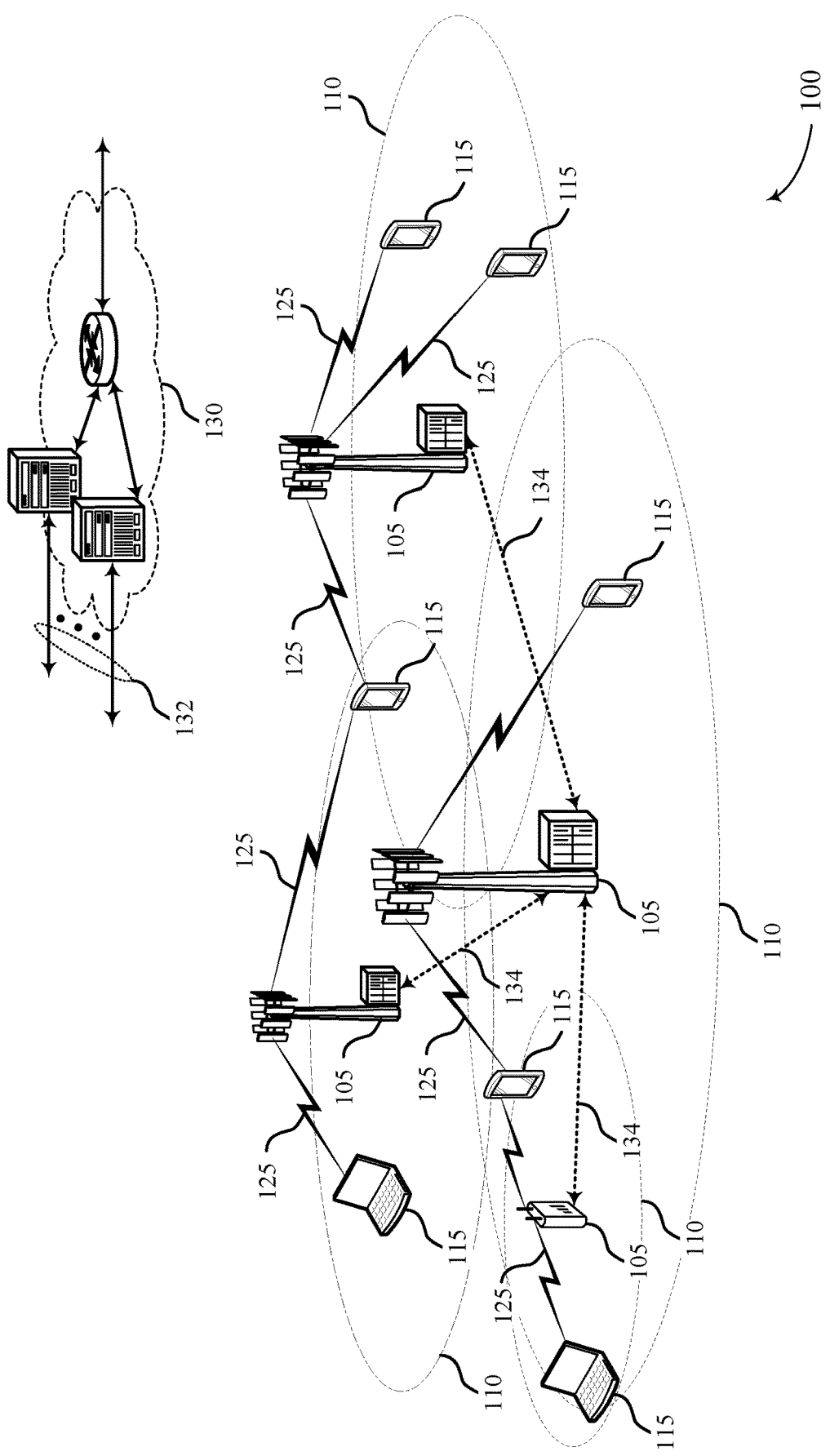
FIG. 1 illustrates an example of a system for wireless communication that supports mechanisms for sidelink resource scheduling in accordance with aspects of the present disclosure.

Wireless communication systems may support vehicle-based communications. In some examples, wireless communication systems may include or support networks used for vehicle-based communications, also referred to as vehicle-to-everything (V2X) networks, vehicle-to-vehicle (V2V) networks, and/or cellular V2X (C-V2X) networks. Vehicle-based communication networks may provide always-on telematics where user equipments (UEs), e.g., vehicle UEs (v-UEs), communicate directly to the network (V2N), to pedestrian UEs (V2P), to infrastructure devices (V2I), and to other v-UEs (e.g., via the network and/or directly). The vehicle-based communications may include direct communications between a UE and a base station and/or may include sidelink communications between vehicle-based UEs. In some examples, the resources for the sidelink communications may be scheduled by the base station or may be preconfigured and used autonomously by the UEs. However, conventional wireless communication systems may not be configured to schedule resources for sidelink communications using both Long Term Evolution (LTE) resources and New Radio (NR) resources.

Aspects of the disclosure are described in the context of a wireless communications system supporting LTE resources as well as NR resources for vehicle-based sidelink communications. In some examples, vehicle-based sidelink communications in LTE are generally used to transmit basic safety messages between UEs (e.g., vehicles). Additionally, the vehicle-based sidelink communications using resources in NR may be used for detailed messaging between two or more UEs (e.g., vehicles). More specifically, the higher bandwidth resources supported by NR may enable UEs to transmit detailed messages while performing sidelink communications.

In one example, LTE systems may include two modes of operation for vehicle-based sidelink communications. In a first mode of operation, a base station supporting LTE resources may be configured to schedule resource allocations for sidelink communications. In some cases, the first mode of operation may be referred to as Mode 3. In a second mode of operation, a UE may be configured to autonomously select resource allocations for sidelink communications. In some cases, the second mode of operation may be referred to as Mode 4.

In another example, NR systems may similarly include two modes of operation for vehicle-based sidelink communications. In a first mode of operation, a base station supporting NR resources may be configured to schedule resource allocations for sidelink communications. In some cases, the first mode of operation may be referred to as Mode 3. In a second mode of operation, a UE may be configured to autonomously select resource allocations for sidelink communications from a resource pool provided to the UE. In some cases, the second mode of operation may be referred to as Mode 4. In some wireless communication systems, a connection message (such as a Radio Resource Control (RRC) message) from a base station to a UE may provide resource scheduling configuration for sidelink communications. Further, the UE may receive a Physical Downlink Control Channel (PDCCH) or an enhanced PDCCH (ePDCCH), which may provide a grant for performing vehicle-based sidelink communications.

Aspects of the disclosure are described in the context of Mode 3 communications (e.g., a mode of communication where a base station schedules resources for sidelink communications). In some examples, there may be different options for V2X Mode 3 operation. As one example, under Legacy Evolved Universal Terrestrial Radio Access Network (E-UTRAN) coverage, a base station may support LTE resources, and a UE may support V2X communication using LTE resources, as well as V2X communication using both LTE resources and NR resources. Under such scenarios, even though a UE supports V2X communication using both LTE resources and NR resources, the UE may receive LTE resources as scheduled by the base station supporting LTE resources. In some examples, the base station under an E-UTRAN coverage may be upgraded to allocate NR resources for sidelink communication.

As another example, under New Generation Radio Access Network (NG-RAN) Non-Standalone (NSA) coverage, a base station supporting LTE resources may be deployed along with a base station supporting NR resources. In such cases the base stations may have dual-connectivity, which may be referred to as E-UTRAN New Radio-Dual Connectivity (EN-DC). Further, a UE may support V2X communication using LTE resources, as well as V2X communication using both LTE resources and NR resources. In some cases, when the UE is under LTE coverage, it may primarily receive LTE resources for sidelink communications. In some examples, the base station under an NG-RAN NSA coverage may coordinate with neighboring base stations (such as base stations supporting NR resources) to allocate NR resources for sidelink communication.

As a third example, under NR Standalone (SA) coverage, a base station may support both LTE resources and NR resources. In some cases, a UE may support V2X communication using LTE resources, as well as V2X communication using both LTE resources and NR resources. Under such scenarios, the base station may be configured to provide NR resources to the UE for performing sidelink communications. Additionally or alternatively, the base station may support LTE operations. More specifically, the base station may be configured to provide LTE resources to the UE for performing sidelink communications.

In some wireless communication systems supporting NR SA coverage, the base station may be configured to schedule NR resources for performing vehicle-based sidelink communications in two phases. During a first phase, the base station may establish a connection with a UE and may provide resource scheduling information to the UE. As part of the connection procedure, the UE may transmit a request for resource scheduling information. For example, the UE may transmit a request indicating an intent to perform vehicle-based sidelink communication. Upon receiving the request, the base station may transmit a response indicating the requested resource scheduling information. In some examples, the response may be a one-time configuration for resource scheduling.

During the second phase, the UE may identify sidelink traffic in a sidelink buffer. Based on identifying data for an upcoming sidelink communication, the UE may request one or more grants to perform the sidelink communication. In some cases, the UE may transmit a Buffer Status Report (BSR) indicating data for sidelink communication remaining in a sidelink buffer. In some cases, upon receiving the request, the base station may be configured to provide one or more grants to the UE for performing sidelink communications. In some examples, the base station may be configured to allocate the physical resources using PDCCH signaling and a Downlink Control Indicator (DCI). More specifically, the DCI may be configured to indicate time and frequency resources for performing vehicle-based sidelink communications. In some cases, the grants may be based on the resource scheduling information indicated by the base station during the first phase. Upon receiving the grants from the base station, the UE may be configured to utilize the grants to perform sidelink communications with other UEs.

In some examples, the base station may transmit broadcast information that identifies types of resources for vehicle-based sidelink communications that are supported by the base station. For example, the base station may broadcast system information indicating whether the base station supports LTE resources and/or NR resources for scheduling vehicle-based sidelink communications. In some cases, the UE may receive the broadcast information and may determine whether to perform sidelink communications using NR resources, LTE resources, or both. In some cases, the UE may transmit a request to the base station, requesting resource scheduling information to perform sidelink communications. In some cases, the UE may indicate a preference of resources and a quality of service (QoS) metric in the request. For example, the UE may indicate a type of resources for the sidelink communication and a QoS metric for sidelink communication.

In some examples, for NR resources, the indicated QoS metric may be one or more fifth generation (5G) QoS Indicator (5QI) values. Additionally or alternatively, the UE may be configured to provide a mapping between a logical channel ID (LCID) and the 5QI values to the base station. Further, in some examples, the UE may be configured to provide another mapping between a logical channel group (LCG) ID and the 5QI values to the base station. In some cases, the request sent by the UE may be a part an RRC request. In some cases, the UE may indicate whether it requests NR resources, LTE resources, or both, for scheduling the vehicle-based sidelink communications. In some cases, the request may be included in a sidelink information message to the base station, an assistance information message to the base station, or both.

In one example, the UE may request LTE resources for performing vehicle-based sidelink communications. For requesting LTE resources, the UE may indicate a list of carrier frequencies for performing the sidelink communications and a QoS metric associated with the sidelink communication.

In some examples, the base station may receive the request for resource scheduling information and may transmit a response including the resource scheduling information to perform vehicle-based sidelink communications. In some examples, the base station may determine a type of resources requested by the UE. Depending upon the type of requested resources, the base station may transmit the resource scheduling information based on LTE resources, NR resources, or both. In some examples, when the UE requests NR resources, the base station may be configured to include at least one of: an information related to a Bandwidth Part (BWP) associated with the sidelink communication, decoding information, a location of at least one grant associated with the sidelink communication, a scrambling identifier, one or more mappings associated with the requested QoS metric, or a combination thereof, in the response.

In some examples, the base station may be configured to indicate BWP information associated with downlink, as well as sidelink BWP information, in the response to the UE. For example, a list of BWP parameters in the response may indicate one or more places in a communication band where downlink operations or sidelink operations may take place. In some examples, the decoding information may include a Control Resource Set (CORESET) information. For example, upon receiving the CORESET information, the UE may utilize the CORESET information to identify a location to decode a PDCCH from the base station to receive one or more grants for performing the sidelink communications. Further, in some cases, the location of at least one grant may be indicated using a "K" value. In one example, "K" values may be configured to indicate whether a PDCCH includes downlink or uplink grants. If the PDCCH includes downlink or uplink grants, the "K" value may further indicate a number of slots between an occurrence of the sidelink grant and an occurrence of the downlink or uplink grants.

In some examples, the scrambling indicator may indicate an ID with which PDCCH messages, including grants for sidelink communication, may be scrambled. In some examples, the scrambling identifier may be an NR V2X Radio Network Temporary Identifier (NR-V2X-RNTI). In some cases, the base station may include a mapping between the LCID and the 5QI values in the response. Upon receiving the mapping, the UE may determine whether the base station has accepted the QoS metric indicated by the UE. In some cases, the base station may alter the QoS metric and may inform the UE of the altered QoS metric. For example, the base station may modify the LCID-5QI mapping to indicate the altered QoS for sidelink communications. In some examples, when the UE requests LTE resources, the base station may be configured to include within the response, a carrier frequency of a sidelink operation using LTE resources and a "K" value for the grants for sidelink communication.

After receiving the configuration from the base station, the UE may identify data for performing sidelink communication. In some examples, the UE may transmit a second request for at least one grant from the base station to perform the vehicle-based sidelink communication. In some cases, the second request may be based on the resource scheduling information received during the RRC procedure. In some examples, the UE may include an LCG ID in the second request. For example, the UE may be configured to identify an LCG ID from the response during the RRC connection procedure. In some examples, the UE may additionally include an amount of data that the UE will be transmitting during the sidelink communication, and a frequency of transmission, in the second request. In some cases, the UE may indicate BWPs for performing the upcoming sidelink communication.

Based on the received request (i.e., the second request), the base station may transmit a second response indicating at least one grant allocated on a set of carrier frequencies. In some cases, the at least one grant may be allocated based on the type of resources indicated in the request during the configuration procedure. For example, the base station may allocate the at least one grant using LTE resources, NR resources, or both. In some cases, the UE may receive a DCI and may identify the allocated grant based on the DCI. In some examples, the type of resources used for allocation of the grant may be indicated in a bit included in the DCI. In some examples, the second response from the base station may include a timing associated with the at least one grant, a frequency associated with the at least one grant, a BWP associated with the at least one grant, a Modulation and Coding Scheme (MCS), a Carrier Indicator Field (CIF), or a combination thereof.

As previously discussed, the UE may identify a scrambling identifier (e.g., NR-V2X-RNTI) from the first response and may identify the at least one grant based on determining that the at least one grant is scrambled using the scrambling identifier. For example, upon identifying the at least one grant in the second response, the UE may begin to parse the second response to identify the at least one grant. In some cases, the CIF may indicate a carrier frequency used for the at least one grant. In some cases, when scheduling resources for sidelink communication using NR resources, the UE may use the CIF for cross-carrier scheduling. In some examples, the DCI may further include an indication of a switch of BWP for downlink grants, as well as sidelink grants. In some cases, the UE may switch the BWP for sidelink communication after receiving the second response.

In some cases, when scheduling resources for sidelink communication using LTE resources, the UE may determine a location of the LTE grant using the "K" value indicated in the RRC message. For example, upon receiving the grant using LTE resources, the UE may be configured to interpret that the LTE grant for sidelink communicated is provided as "K" milliseconds away from the beginning of the millisecond in which the DCI is received. In one embodiment, the downlink or uplink opportunity may be present in the N+K grant, where N is the location of the sidelink grant.

Aspects of the disclosure are initially described in the context of a wireless communications system and mechanisms for sidelink resource scheduling. Aspects of the disclosure are further illustrated by and described with reference to apparatus diagrams, system diagrams, and flowcharts that relate to mechanisms for sidelink resource scheduling.

FIG. 1 illustrates an example of a wireless communications system 100 that supports mechanisms for sidelink resource scheduling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a UE 115 may receive broadcast information from a base station 105. In some examples, the broadcast information may identify types of resources for vehicle-based sidelink communications that are supported by the base station 105. The UE 115 may then transmit a request to the base station 105 for resource scheduling information to perform a vehicle-based sidelink communication based on the broadcast information. In some examples, the request may include an indication of a type of resources for the vehicle-based sidelink communication supported by the base station and a QoS metric associated with the vehicle-based sidelink communication. The UE 115 may receive, in response to the request, a response from the base station 105 that includes the resource scheduling information to perform the vehicle-based sidelink communication.

In some cases, the base station 105 may transmit broadcast information to a UE 115 that identifies types of resources for vehicle-based sidelink communications that are supported by the base station 105. The base station 105 may receive a request from the UE 115 for resource scheduling information to perform a vehicle-based sidelink communication based on the broadcast information. In some cases, the request may include an indication of a type of resources for the vehicle-based sidelink communication supported by the base station and a QoS metric associated with the vehicle-based sidelink communication. In some cases, the base station 105 may transmit to the UE 115, in response to the request, a response that includes the resource scheduling information to perform the vehicle-based sidelink communication.

Figure 2:
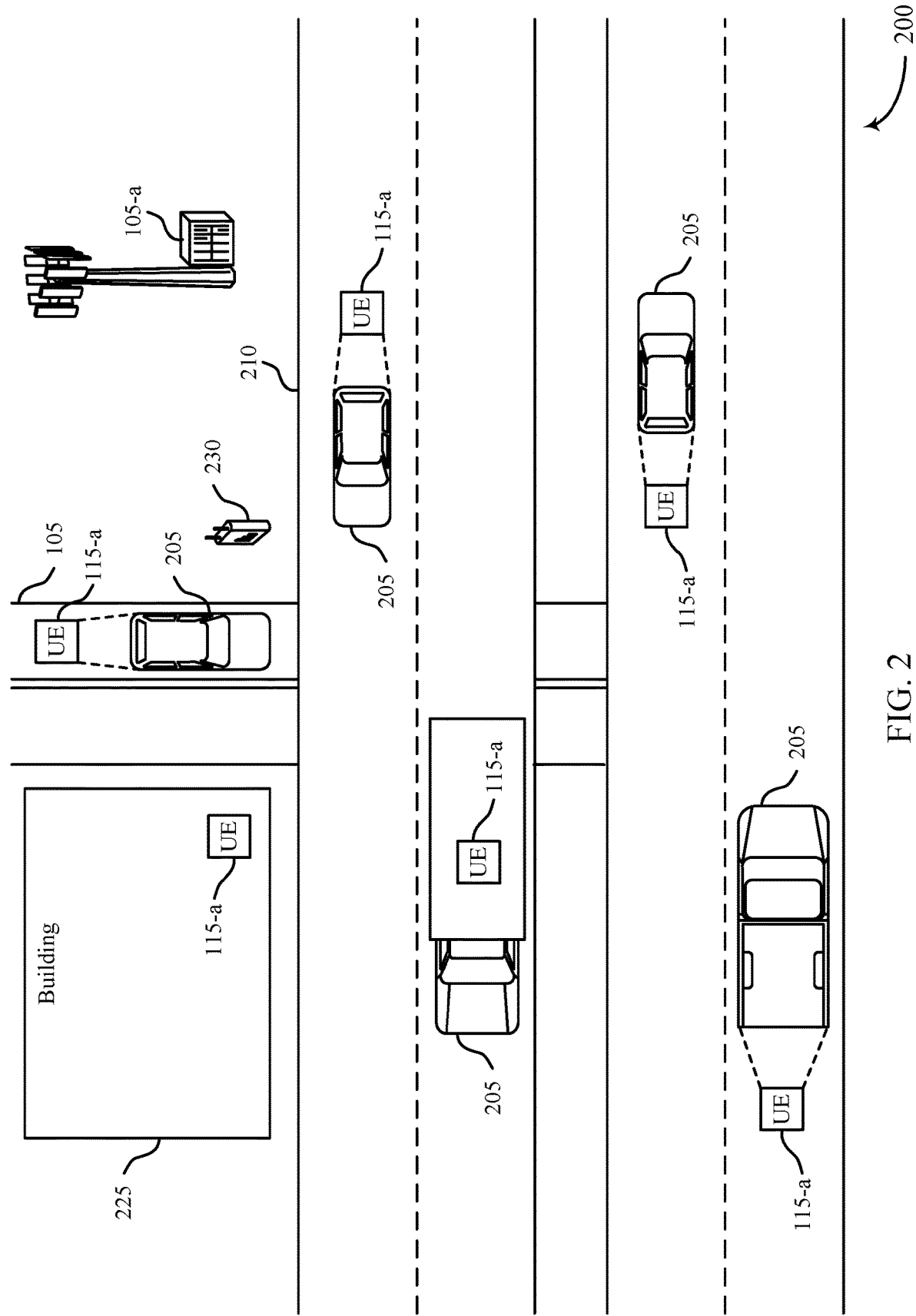
FIG. 2 illustrates an example of a vehicle-to-everything (V2X) communication system that supports mechanisms for sidelink resource scheduling in accordance with aspects of the present disclosure.

FIG. 2 illustrates an example of a V2X communication system 200 that supports mechanisms for sidelink resource scheduling in accordance with various aspects of the present disclosure. In some examples, V2X communication system 200 may implement aspects of wireless communication system 100. The V2X communication system 200 may be configured to communicate information between devices of a certain type (e.g., vehicles 205) or to communicate information to any device that may interact with a certain type of device (e.g., vehicle 205). V2X communication systems 200 may be implemented along roads 210 and other transportation through-ways. The V2X communication system 200 may incorporate aspects of other types of communication systems includes V2I communication systems, V2V communication systems, V2P communication systems, vehicle-to-device (V2D) communication systems, vehicle-to-grid (V2G) communication systems, or a combination thereof.

The V2X communication system 200 may include a number of base stations 105-*a* and UEs 115-*a*. The base stations 105-*a* may be configured to coordinate multiple types of communications in the V2X communication system 200 and to provide an access point for UEs of the V2X communication system 200 to access outside networks (e.g., the Internet). The base station 105-*a* may be an example of the base stations 105 described with reference to FIG. 1. The base stations 105-*a* and the UEs 115-*a* may communicate using one or more communication links (not shown for clarity purposes). The communication links of the V2X communication system 200 may be examples of the communication links 125 described with reference to FIG. 1, among other examples.

The UEs 115-*a* of the V2X communication system 200 may be examples of devices associated with a number of different entities. Some UEs 115-*a* may be integrated with a vehicle 205, or with another mobile device. Some UEs 115-*a* may be integrated with buildings 225, or with another fixed structure or device. Some UEs 115-*a* may be integrated with other road side assistance applications. For example, signs, infrastructure, power systems, and other entities may include UEs 115-*a* that communicate using the V2X communication system 200. In some examples, road side repeaters 230 may include a UE 115-*a*, which may communicate using the V2X communication system 200. The V2X communication system 200 may also connect UEs 115-*a* associated with individuals. For example, UEs 115-*a* (e.g., smartphones) associated with drivers, pedestrians, and/or other individuals may communicate using the V2X communication system 200. The UEs 115-*a* may be examples of the UEs 115 described with reference to FIG. 1.

In some cases, the UEs 115-*a* may be configured to receive scheduling information from the base station 105-*a*. In some cases, the scheduling information may be associated with resources to perform V2X communications. In some examples, the base station 105-*a* may broadcast information identifying types of resources for vehicle-based sidelink communications that are supported by the base station. For example, the base station 105-*a* may indicate whether it supports LTE resources, NR resources, or both types of resources, for all vehicle-based sidelink communications. In some examples, the UE 115-*a* may receive the broadcast information and may transmit a request to the base station for resource scheduling information to perform a vehicle-based sidelink communication based on the broadcast information. In some cases, the UE may include in the request an indication of a type of resources for the vehicle-based sidelink communication supported by the base station and a QoS metric associated with the vehicle-based sidelink communication. Upon receiving the request, the base station 105-*a* may transmit a response including the resource scheduling information to perform the vehicle-based sidelink communication.

Figure 3:
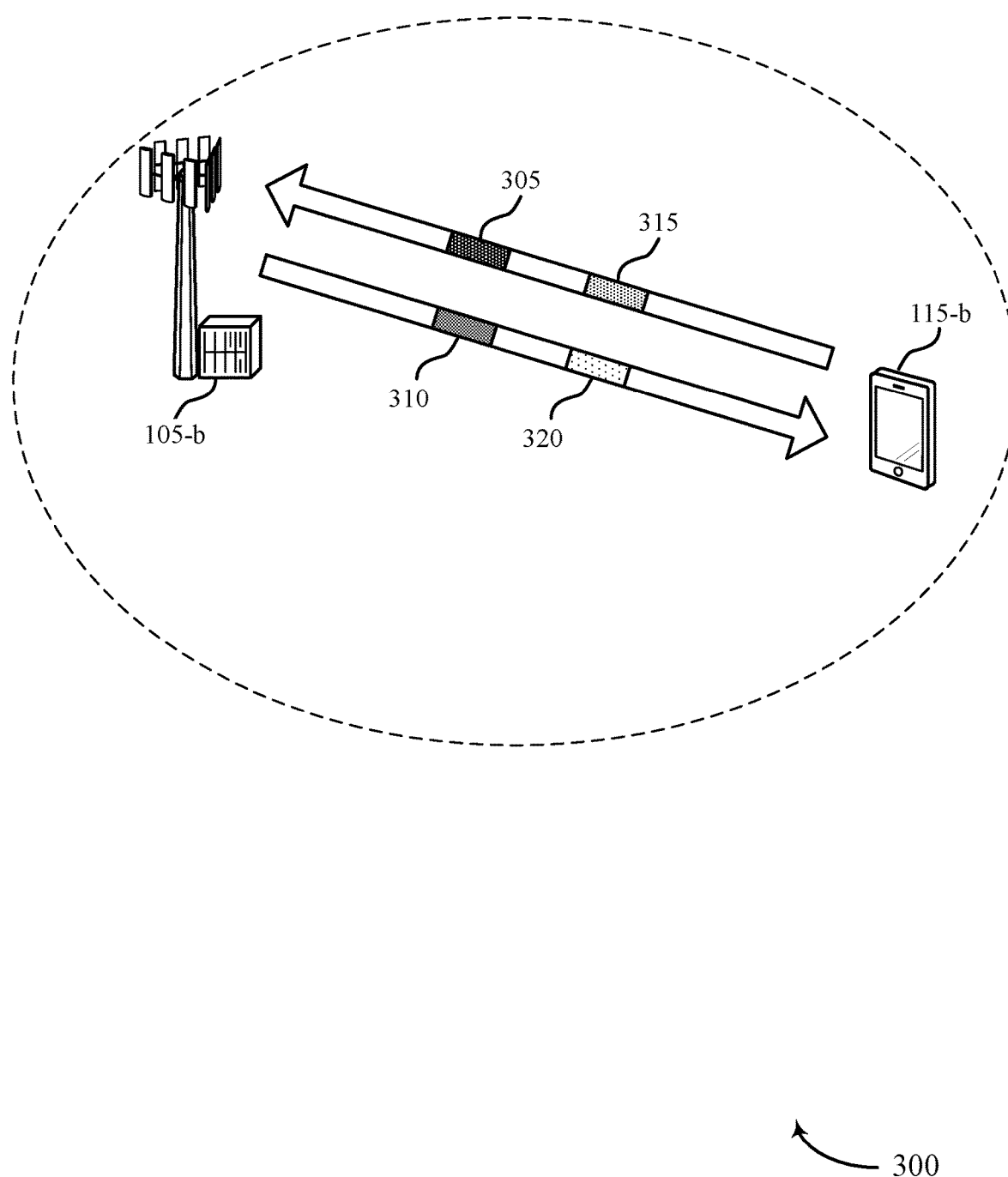
FIG. 3 illustrates an example of a wireless communication system that supports mechanisms for sidelink resource scheduling in accordance with aspects of the present disclosure.

FIG. 3 illustrates an example of a wireless communication system 300 that supports mechanisms for sidelink resource scheduling in accordance with various aspects of the present disclosure. In some examples, wireless communication system 300 may implement aspects of wireless communication system 100 and V2X communication system 200. Wireless communication system 300 may include a base station 105-*b*, and a UE 115-*b*, which may be examples of the corresponding devices described herein.

As previously described, wireless communication system 300 may include or support networks used for vehicle-based communications, also referred to as V2X networks, V2V networks, and/or C-V2X networks. Vehicle-based communication networks may provide always-on telematics where UEs (e.g., v-UEs) communicate directly to the network (V2N), to pedestrian UEs (V2P), to infrastructure devices (V2I), and to other v-UEs (e.g., via the network and/or directly).

Wireless communication system 300 may include or support mechanisms for sidelink resource scheduling. In some examples, the base station 105-*b* may be deployed under NR SA coverage. In some cases, the base station 105-*b* may support both LTE resources, as well as NR resources. In some cases, the UE 115-*b* may support V2X communication using LTE resources, as well as V2X communication using both LTE resources and NR resources. As previously discussed, the UE 115-*b* may receive resources (or grants) for sidelink communication from the base station 105-*b*. Upon receiving the grants, the UE 115-*b* may use the grants to perform vehicle-based sidelink communication with a second UE (not shown). In such cases, the base station 105-*b* may provide NR resources to the UE 115-*b* for performing sidelink communications. Additionally or alternatively, the base station 105-*b* may also support LTE operations. For example, the base station 105-*b* may be configured to provide LTE resources to the UE 115-*b* for performing sidelink communications.

During a configuration phase, the base station 105-*b* may transmit broadcast information that identifies types of resources for vehicle-based sidelink communications that are supported by the base station 105-*b*. For example, the base station 105-*b* may broadcast system information indicating whether the base station 105-*b* supports LTE resources, NR resources, or both, for scheduling vehicle-based sidelink communications. The UE 115-*b* may receive the broadcast information and may determine to perform sidelink communications using a type of resources indicated by the base station 105-*b*. For example, the UE 115-*b* may determine to perform sidelink communication using NR resources, LTE resources, or both. In some cases, the UE 115-*b* may transmit a request 305 to the base station 105-*b* requesting resource scheduling information to perform sidelink communications. In some cases, the UE 115-*b* may indicate a type of resources and a QoS metric in the request. For example, the type of resources indicated by the UE 115-*b* may be based on the resources supported by the base station 105-*b*. For example, if the base station 105-*b* broadcasts that it supports NR resources, then the UE 115-*b* may request sidelink grants allocated on NR resources. On the other hand, if the base station 105-*b* broadcasts that it supports both NR resources as well as LTE resources, then the UE 115-*b* may request allocation of sidelink grants on NR resources, LTE resources, or both.

In some examples, when requesting resource scheduling information using NR resources, the indicated QoS metric may be one or more 5QI values. In some cases, the UE 115-*b* may provide a mapping between an LCID and the 5QI values to the base station 105-*b*. Further, in some examples, the UE 115-*b* may be configured to provide another mapping between an LCG ID and the 5QI values to the base station 105-*b*. In some cases, the request 305 for resource scheduling information may be a part of an RRC request. In some examples, the request 305 may be included in a sidelink information message to the base station 105-*b*. In some cases, the request 305 may be included in an assistance information message to the base station 105-*b*. In some cases, the request 305 may be included in both the sidelink information message to the base station 105-*b* and the assistance information message to the base station 105-*b*.

In some examples, the base station 105-*b* may receive the request 305 for resource scheduling information and may transmit a response 310 including the resource scheduling information to perform vehicle-based sidelink communications. In some examples, the base station 105-*b* may determine a type of resources requested by the UE 115-*b* and may transmit the resource scheduling information based the requested type of resources. For example, the resource scheduling information may be based on LTE resources, NR resources, or both. In some examples, when the UE 115-*b* requests NR resources, the response 310 may include at least one of: an information related to a BWP associated with the sidelink communication, decoding information, a location of at least a grant associated with the sidelink communication, a scrambling identifier, one or more mappings associated with the requested QoS metric, or a combination thereof.

In some examples, the BWP information may include BWP information associated with downlink as well as BWP information associated with sidelink. In some examples, the base station 105-*b* may include a list of BWP parameters in the response 310. For example, the list of BWP parameters may indicate one or more places in a communication band where downlink operations or sidelink operations may take place. In some examples, the decoding information may include CORESET information. In some cases, the UE 115-*b* may receive the CORESET information and may utilize the CORESET information to identify a location to decode a PDCCH from the base station to receive one or more grants for performing sidelink communications. In some examples, the location of at least one grant may be indicated using a location indicator or "K" value. For example, the location indicator (or "K" value) may indicate whether a PDCCH includes downlink or uplink grants and may indicate a number of slots between an occurrence of the sidelink grant and an occurrence of downlink or uplink grants.

In some examples, the scrambling indicator (such as NR-V2X-RNTI) may indicate an ID with which grants for sidelink communication may be scrambled by the base station 105-*b*. Thus, the UE 115-*b*, upon receiving a message including a grant for sidelink communication, may identify whether the message is scrambled using the scrambling identifier. In some cases, the one or more mappings may include a first mapping between the LCID and the 5QI values and a second mapping between the LCID and the LCG ID. In some cases, upon receiving the first mapping or the second mapping, the UE 115-*b* may determine whether the base station 105-*b* has accepted the QoS metric indicated by the UE 115-*b* in the request 305 for resource scheduling information. In some cases, the base station 105-*b* may determine to alter the QoS metric. Upon altering the QoS metric, the base station 105-*b* may inform the UE 115-*b* of the altered QoS metric. In some cases, the base station 105-*b* may alter the QoS metric based on a traffic level at the base station 105-*b*. In some examples, when the UE 115-*b* requests LTE resources for performing sidelink communications, the base station 105-*b* may be configured to include a carrier frequency of a sidelink operation using LTE resources and a "K" value for the grants for sidelink communication.

During a grant request phase, the UE 115-*b* may identify data in a sidelink buffer. For example, the data in the sidelink buffer may indicate that the UE 115-*b* has data waiting for performing sidelink communication. In some examples, the UE 115-*b* may transmit a second request 315 for at least one grant from the base station 105-*b* to perform the vehicle-based sidelink communication. For example, the UE 115-*b* may request for the base station 105-*b* to transmit one or more grants to use for transmitting the data in the sidelink buffer. In some cases, the second request 315 may be based on the resource scheduling information received during the RRC procedure. In some examples, the UE 115-*b* may include an amount of data that the UE 115-*b* will be transmitting during the sidelink communication, and a frequency of transmission, in the second request 315. In some cases, the UE 115-*b* may indicate BWPs for performing the upcoming sidelink communication in the second request 315.

Based on the second request 315, the base station 105-*b* may transmit a second response 320 indicating at least one grant allocated on a set of carrier frequencies. In some cases, the at least one grant may be allocated based on the type of resources indicated in the request during the configuration phase. For example, the base station 105-*b* may allocate the at least one grant using LTE resources, NR resources, or both. Upon receiving the grant, the UE 115-*b* may be configured to perform sidelink communication using the received grant.

Figure 4:
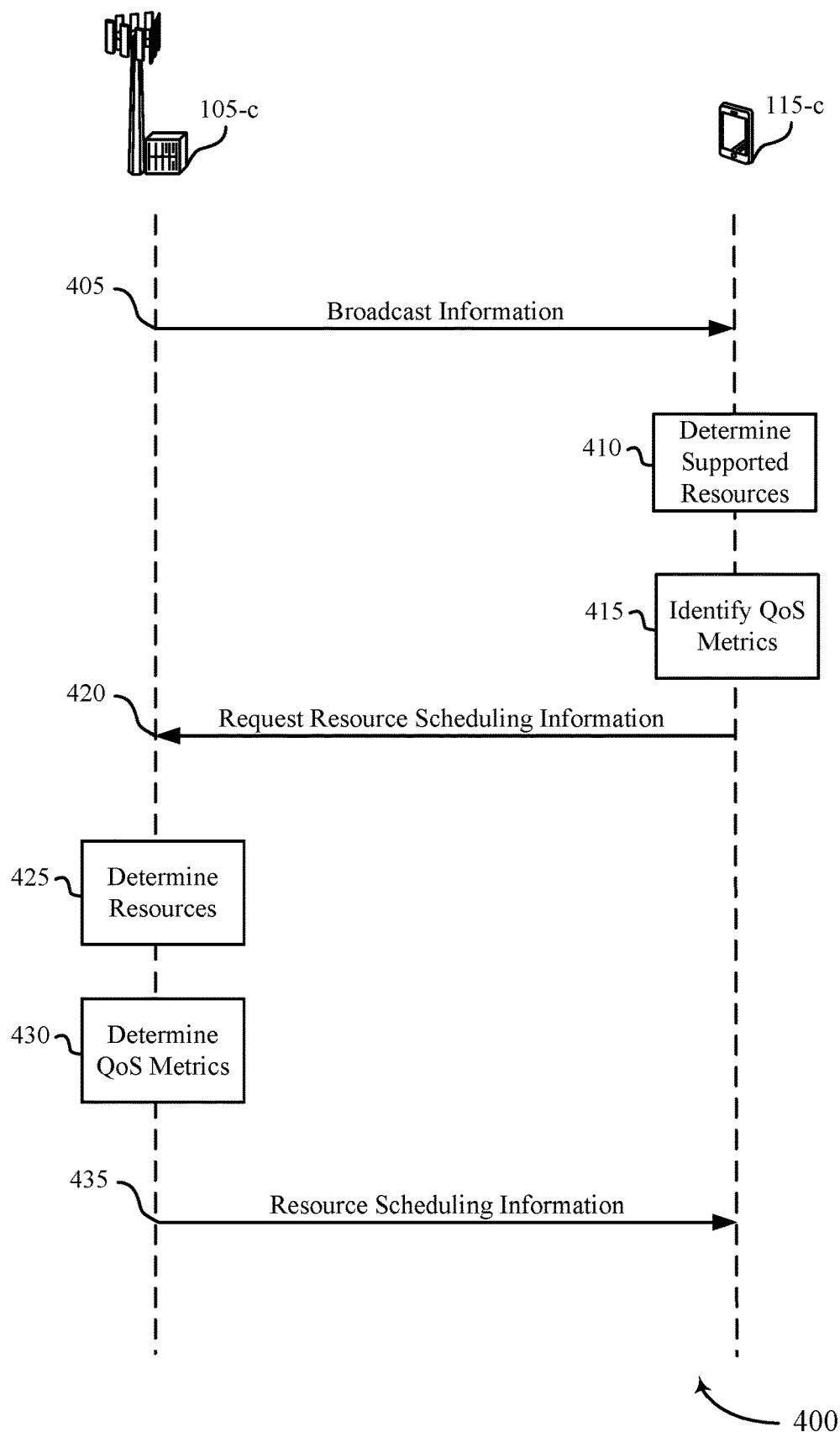
FIG. 4 illustrates an example of a process flow that supports mechanisms for sidelink resource scheduling in accordance with aspects of the present disclosure.

FIG. 4 illustrates an example of a process flow 400 that supports mechanisms for sidelink resource scheduling in accordance with various aspects of the present disclosure. In some examples, process flow 400 may implement aspects of wireless communication system 100. Process flow 400 may include a base station 105-*c*, which may be an example of the base station 105 as described with reference to FIG. 1, the base station 105-*a* as described with reference to FIG. 2, and base station 105-*b* as described with reference to FIG. 3. Also, process flow 400 may include a UE 115-*c*, which may be an example of the UE 115 as described with reference to FIG. 1, the UE 115-*a* as described with reference to FIG. 2, and the UE 115-*b* as described with reference to FIG. 3.

In the following description of the process flow 400, the operations between the base station 105-*c* and UE 115-*c* may be transmitted in a different order than the exemplary order shown, or the operations performed by base station 105-*c* and UE 115-*c* may be performed in different orders or at different times. Certain operations may also be left out of the process flow 400, or other operations may be added to the process flow 400. It is to be understood that while base station 105-*c* and UE 115-*c* are shown performing a number of the operations of process flow 400, any wireless device may perform the operations shown.

At 405, the base station 105-*c* may transmit broadcast information that identifies types of resources for vehicle-based sidelink communications that are supported by the base station 105-*c*. For example, the types of resources may include LTE resources, NR resources, or both LTE resources and NR resources. In some cases, the broadcast information may indicate that the base station 105-*c* supports scheduling of LTE-PC5 (LTE D2D interface) resources and/or NR-PC5 resources.

At 410, the UE 115-*c* may determine the resources supported by the base station 105-*c*. For example, the UE 115-*c* may determine that the base station 105-*c* supports scheduling of LTE resources, NR resources, or both LTE resources and NR resources.

At 415, the UE 115-*c* may identify QoS metrics for a vehicle-based sidelink communication. In one example, when requesting resource scheduling information using NR resources, the QoS metrics associated with the vehicle-based sidelink communication may be 5QI values.

At 420, the UE 115-*c* may transmit a request to the base station 105-*c* for resource scheduling information to perform a vehicle-based sidelink communication. In some cases, the request for resource scheduling information may be based on the broadcast information. In some cases, the request may include an indication of a type of resources for the vehicle-based sidelink communication supported by the base station (e.g., LTE-PC5 or NR-PC5) and a QoS metric associated with the vehicle-based sidelink communication. In some examples, the request may be included in an RRC message.

At 425, the base station 105-*c* may receive the request for resource scheduling information and may determine the requested type of resources. For example, the base station 105-*c* may determine that the requested type of resources includes LTE resources, NR resources, or both LTE resources and NR resources.

At 430, the base station 105-*c* may determine QoS metrics associated with the vehicle-based sidelink communication. In some cases, the determined QoS metrics may be based on the QoS metrics indicated by the UE 115-*c* in the request.

At 435, the base station 105-*c* may transmit, to the UE 115-*c*, a response that includes the resource scheduling information to perform the vehicle-based sidelink communication. In some cases, the response may further include information related to a BWP associated with the vehicle-based sidelink communication, decoding information for the vehicle-based sidelink communication, a location of at least one grant associated with the vehicle-based sidelink communication, a scrambling identifier associated with the vehicle-based sidelink communication, one or more mappings associated with the requested QoS metric, or a combination thereof.

Figure 5:
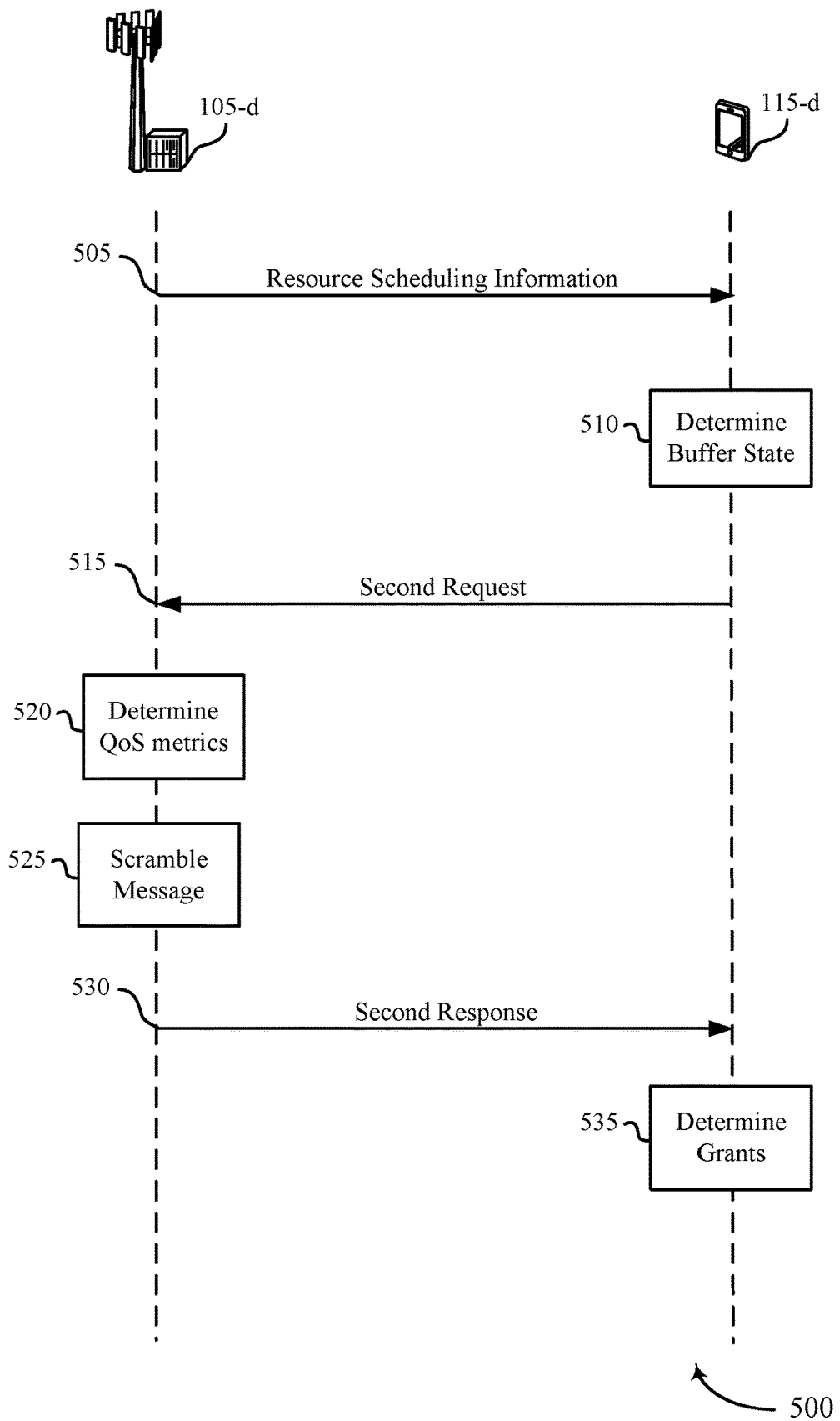
FIG. 5 illustrates an example of a process flow that supports mechanisms for sidelink resource scheduling in accordance with aspects of the present disclosure.

FIG. 5 illustrates an example of a process flow 500 that supports mechanisms for sidelink resource scheduling in accordance with various aspects of the present disclosure. In some examples, process flow 500 may implement aspects of wireless communication system 100. The base station 105-*d* may be an example of the base station 105 as described with reference to FIG. 1, the base station 105-*a* as described with reference to FIG. 2, and base station 105-*b* as described with reference to FIG. 3. Also, the UE 115-*d* may be an example of the UE 115 as described with reference to FIG. 1, the UE 115-*a* as described with reference to FIG. 2, and the UE 115-*b* as described with reference to FIG. 3.

In the following description of the process flow 500, the operations between the base station 105-*d* and UE 115-*d* may be transmitted in a different order than the exemplary order shown, or the operations performed by base station 105-*d* and UE 115-*d* may be performed in different orders or at different times. Certain operations may also be left out of the process flow 500, or other operations may be added to the process flow 500. It is to be understood that while base station 105-*d* and UE 115-*d* are shown performing a number of the operations of process flow 500, any wireless device may perform the operations shown.

At 505, the base station 105-*d* may transmit, to the UE 115-*d*, a response that includes resource scheduling information to perform vehicle-based sidelink communication. In some cases, the response may further include information related to a BWP associated with the vehicle-based sidelink communication, decoding information for the vehicle-based sidelink communication, a location of at least a grant associated with the vehicle-based sidelink communication, a scrambling identifier associated with the vehicle-based sidelink communication, one or more mappings associated with the requested QoS metric, or a combination thereof.

At 510, the UE 115-*d* may determine a buffer state. In some examples, the UE 115-*d* may determine a state of a sidelink buffer. For example, the UE 115-*d* may determine whether the UE 115-*d* has data for transmitting using vehicle-based sidelink communications.

At 515, the UE 115-*d* may transmit a second request for at least one grant from the base station to perform the vehicle-based sidelink communication. In some cases, the request may be based on the received resource scheduling information. In some cases, the UE 115-*d* may transmit the second request using a BSR.

At 520, the base station 105-*d* may determine QoS metrics associated with the vehicle-based sidelink communication. In some cases, the QoS metrics may be based on a traffic load at the base station 105-*d*.

At 525, the base station 105-*d* may scramble at least one grant to perform the vehicle-based sidelink communication using a scrambling identifier. In some cases, the base station 105-*d* may use a scrambling identifier indicated in the response, where the resource scheduling information indicates to scramble the at least one grant.

At 530, the base station 105-*d* may transmit a second response indicating the at least one grant allocated on a set of carrier frequencies based on the type of resources indicated by the UE 115-*d* during the request for resource scheduling information. In some cases, the at least one grant may be allocated using LTE resources, NR resources, or both.

At 535, the UE 115-*d* may determine the at least one grant for performing vehicle-based sidelink communications.

Figure 6:
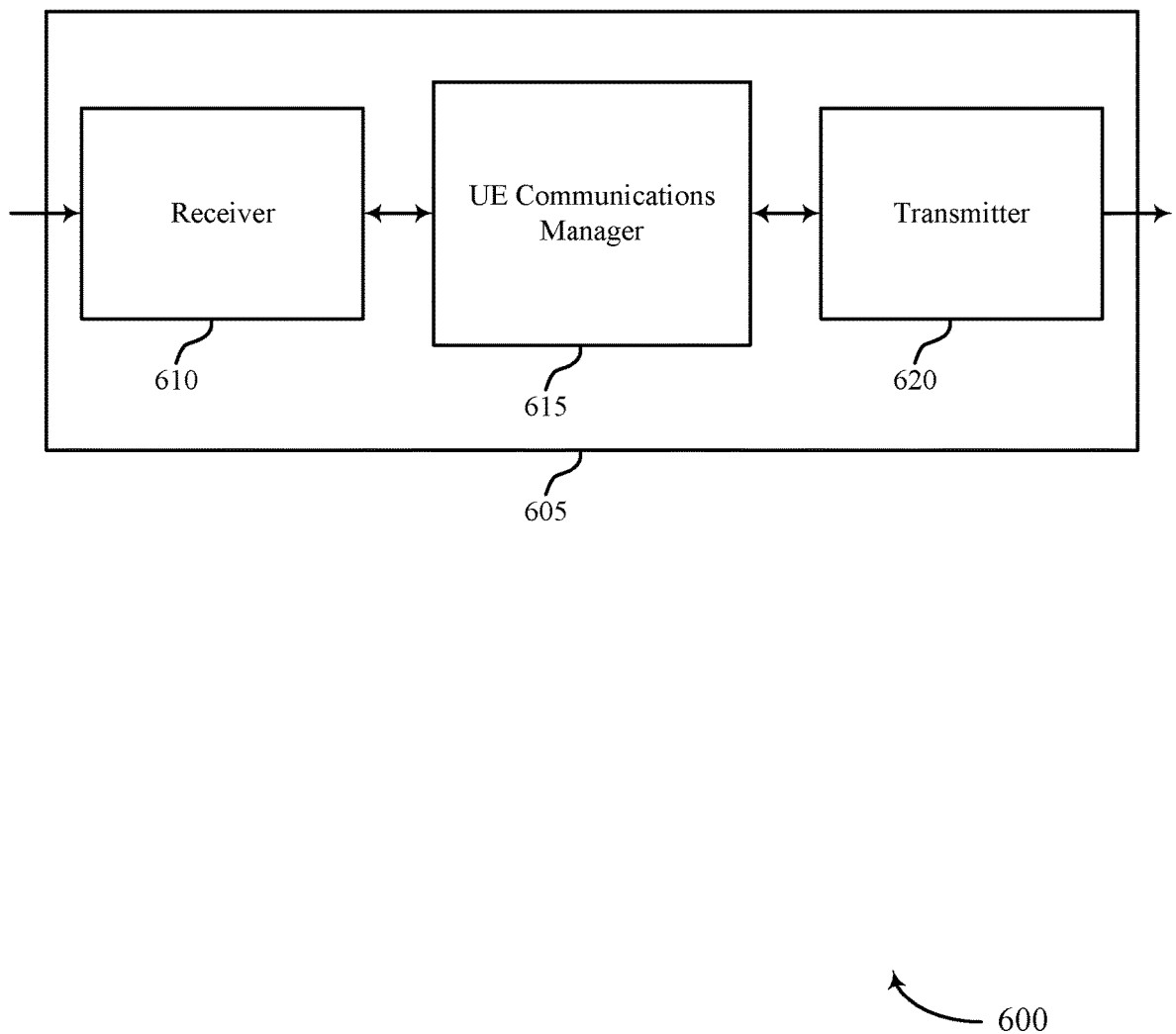
FIGS. 6 through 8 show block diagrams of a device that supports mechanisms for sidelink resource scheduling in accordance with aspects of the present disclosure.

FIG. 6 shows a block diagram 600 of a wireless device 605 that supports mechanisms for sidelink resource scheduling in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to mechanisms for sidelink resource scheduling, etc.). Information may be passed on to other components of the device. The receiver 610 may be an example of aspects of the transceiver 935 described with reference to FIG. 9. The receiver 610 may utilize a single antenna or a set of antennas.

Receiver 610 may receive, in response to a request, a response from the base station that includes resource scheduling information to perform the vehicle-based sidelink communication, and receive a second response indicating the at least one grant allocated on a set of carrier frequencies from the base station based on the type of resources indicated in the request. In some cases, the receiver 610 may receive the at least one grant further based on receiving a DCI.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE communications manager 615 may receive broadcast information from a base station that identifies types of resources for vehicle-based sidelink communications that are supported by the base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Transmitter 620 may transmit the request to the base station for resource scheduling information to perform a vehicle-based sidelink communication based on broadcast information, the request including an indication of a type of resources for the vehicle-based sidelink communication supported by the base station and a QoS metric associated with the vehicle-based sidelink communication, may transmit a second request for at least one grant from the base station to perform the vehicle-based sidelink communication based on the received resource scheduling information, and may transmit a BSR to the base station.

Figure 7:
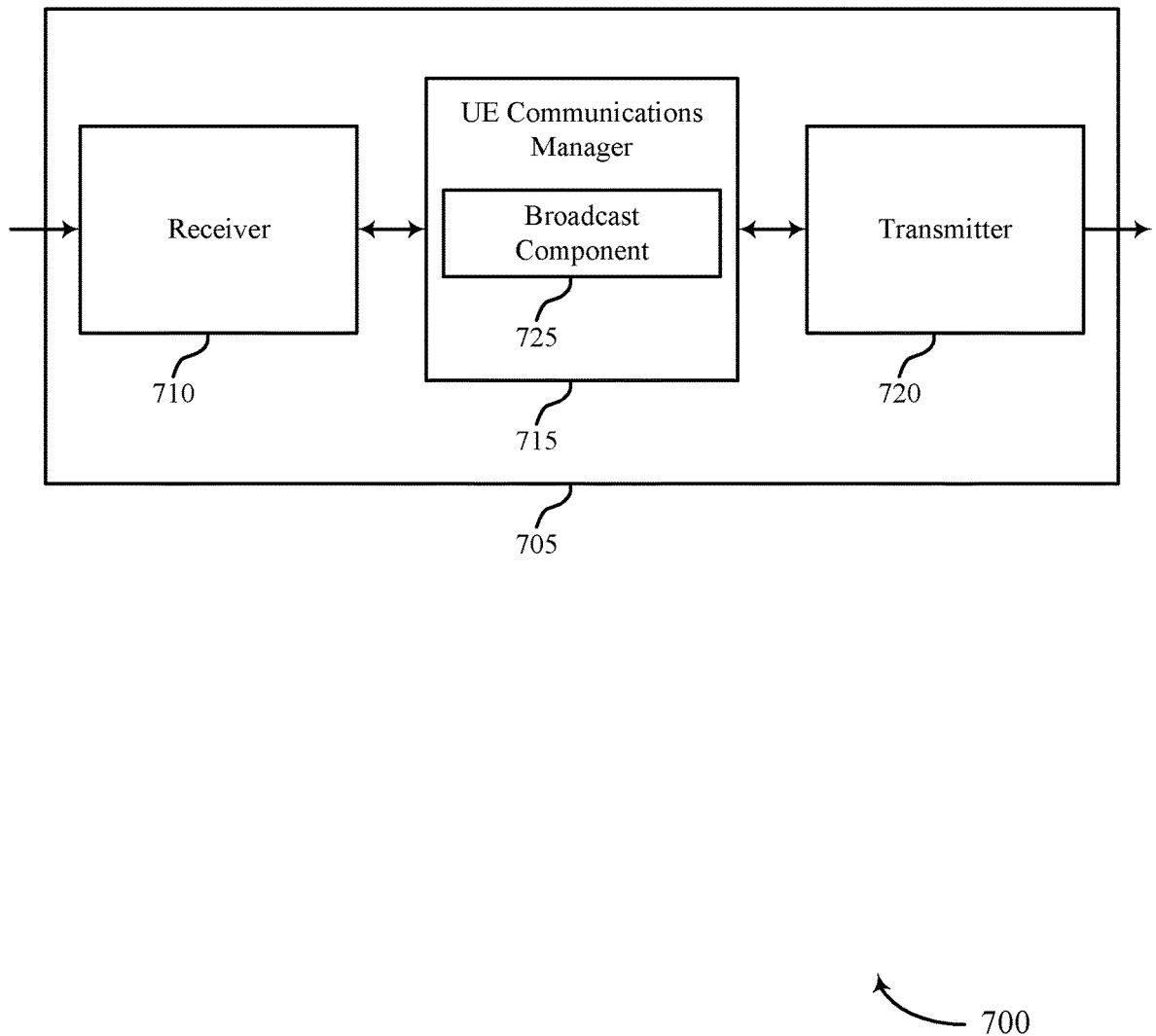

FIG. 7 shows a block diagram 700 of a wireless device 705 that supports mechanisms for sidelink resource scheduling in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to mechanisms for sidelink resource scheduling, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include broadcast component 725.

Broadcast component 725 may receive broadcast information from a base station that identifies types of resources for vehicle-based sidelink communications that are supported by the base station.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
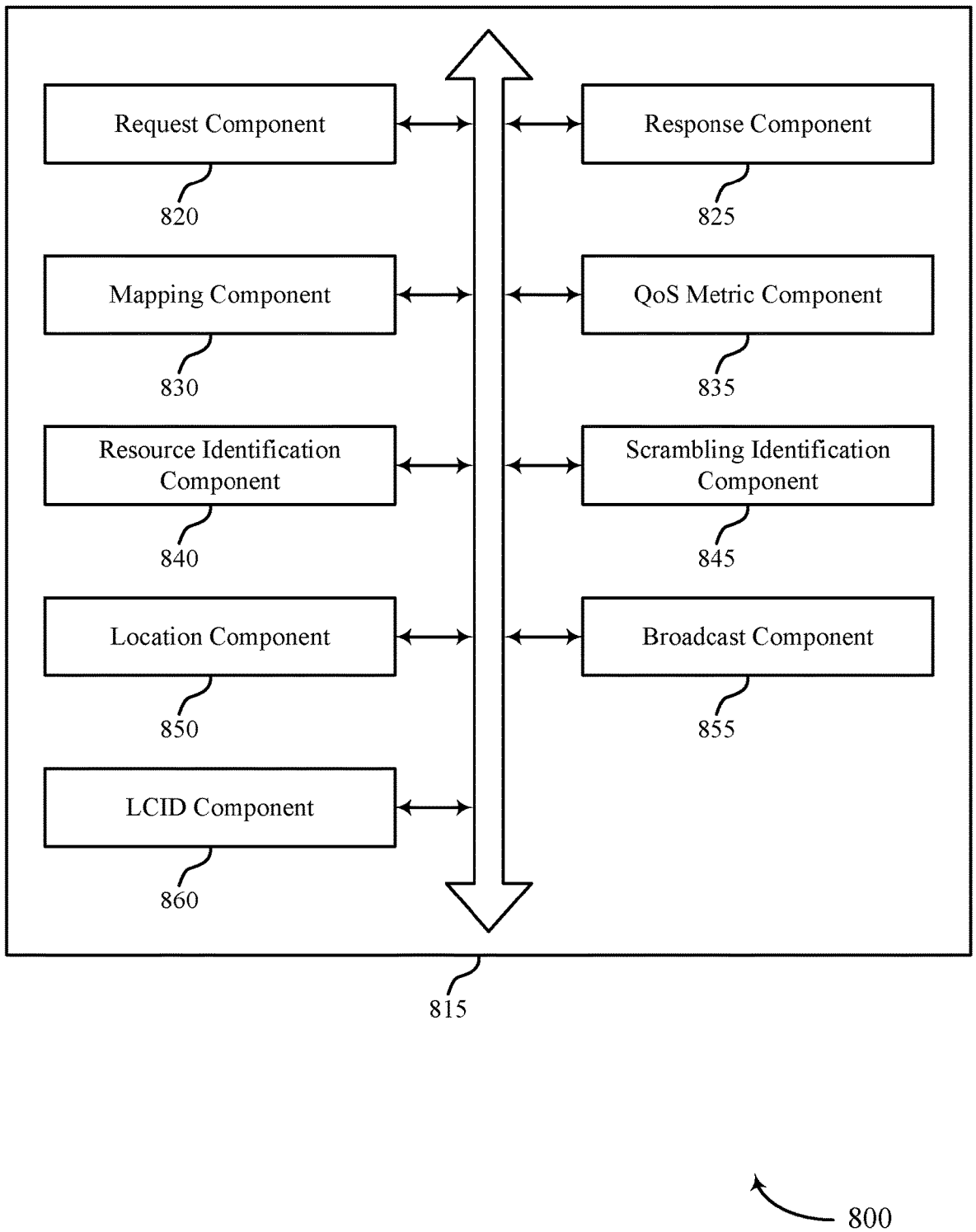

FIG. 8 shows a block diagram 800 of a UE communications manager 815 that supports mechanisms for sidelink resource scheduling in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include request component 820, response component 825, mapping component 830, QoS metric component 835, resource identification component 840, scrambling identification component 845, location component 850, broadcast component 855, and LCID component 860. Each of these modules may communicate, directly or indirectly, with one another (e.g., via one or more buses).

Request component 820 may determine a request to transmit from the UE to the base station. In some cases, the request may be a request for resource scheduling information. In some cases, the request may be included in a sidelink information message to the base station. In some cases, the request is included in an assistance information message to the base station. In some cases, the request is an RRC message.

Response component 825 may determine a response to the request received from a UE. In some cases, the second response includes a timing associated with the at least one grant, a frequency associated with the at least one grant, a BWP associated with the at least one grant, an MCS, a CIF, or a combination thereof. In some cases, the response includes information related to a BWP associated with the vehicle-based sidelink communication, decoding information for the vehicle-based sidelink communication, a location of at least a grant associated with the vehicle-based sidelink communication, a scrambling identifier associated with the vehicle-based sidelink communication, one or more mappings associated with the requested QoS metric, or a combination thereof. In some cases, the decoding information for the vehicle-based sidelink communication includes a CORESET information. In some cases, the one or more mappings associated with the requested QoS metric include at least one of a first mapping between LCID and the requested QoS metric and a second mapping between the LCID and an LCG ID. In some cases, the response may be an RRC message.

Mapping component 830 may identify a mapping between the LCID and the requested QoS metric. In some cases, the mapping component 830 may determine an LCID based on a mapping associated with the requested QoS metric, where the mapping is indicated in the response. QoS metric component 835 may determine whether the requested QoS metric is accepted by the base station based on the mapping.

Resource identification component 840 may determine whether the at least one grant is allocated using LTE resources, NR resources, or both, based on a bit included in the DCI. In some cases, the types of resources include LTE resources, NR resources, or both.

Scrambling identification component 845 may determine a scrambling identifier associated with the vehicle-based sidelink communication based on the response and identify the at least one grant to perform the vehicle-based sidelink communication based on determining that the at least one grant is scrambled using the scrambling identifier.

Location component 850 may determine a location indicator associated with the vehicle-based sidelink communication based on the response and identify a location of the at least one grant based on the location indicator, where the location of the at least one grant is identified in relation to a second grant associated with a downlink communication.

Broadcast component 855 may receive broadcast information from a base station that identifies types of resources for vehicle-based sidelink communications that are supported by the base station. LCID component 860 may determine an LCID based on the received response and include the LCID in the second request for the at least one grant.

Figure 9:
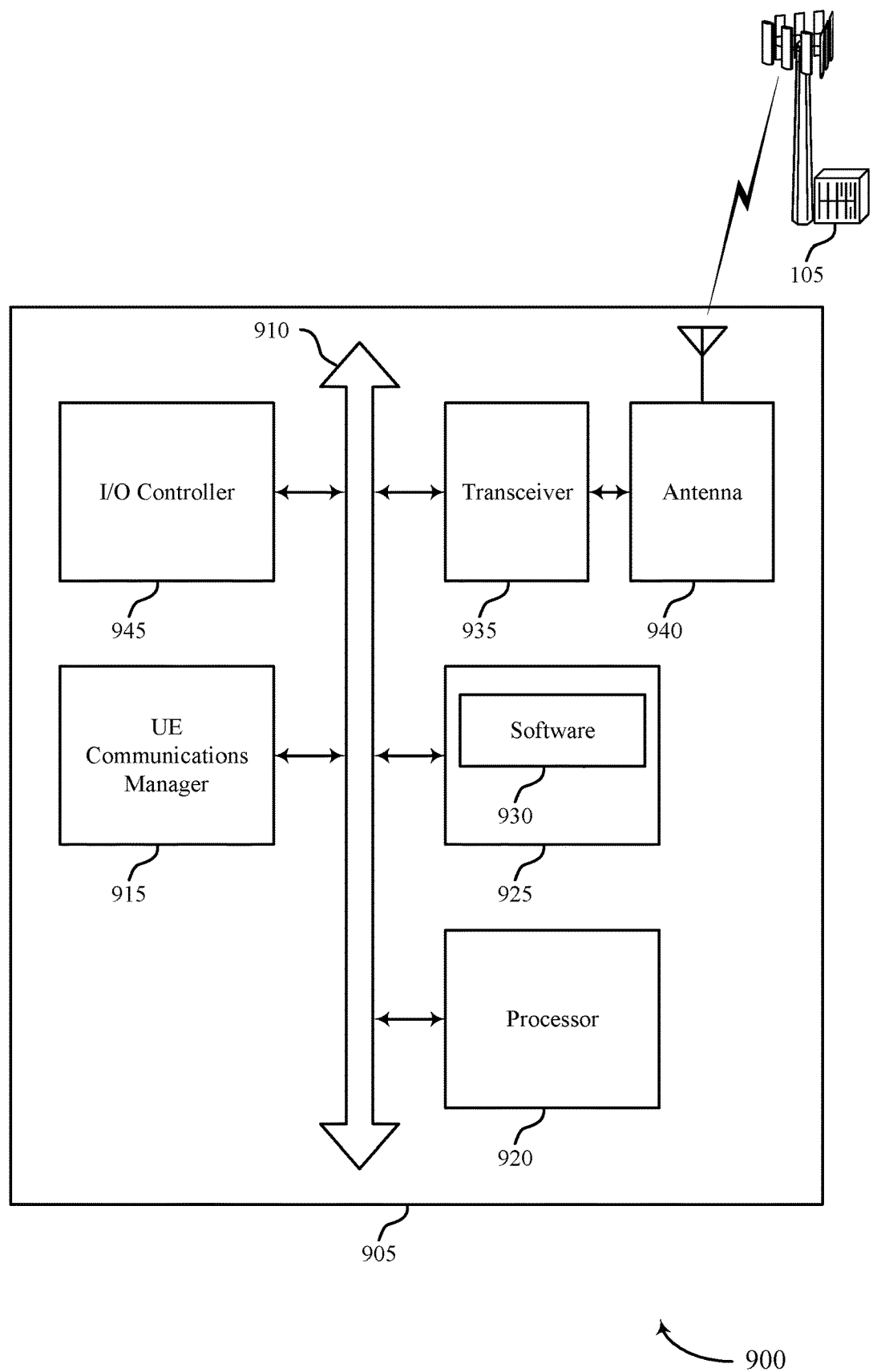
FIG. 9 illustrates a block diagram of a system including a user equipment (UE) that supports mechanisms for sidelink resource scheduling in accordance with aspects of the present disclosure.

FIG. 9 shows a diagram of a system 900 including a device 905 that supports mechanisms for sidelink resource scheduling in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting mechanisms for sidelink resource scheduling).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support mechanisms for sidelink resource scheduling. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
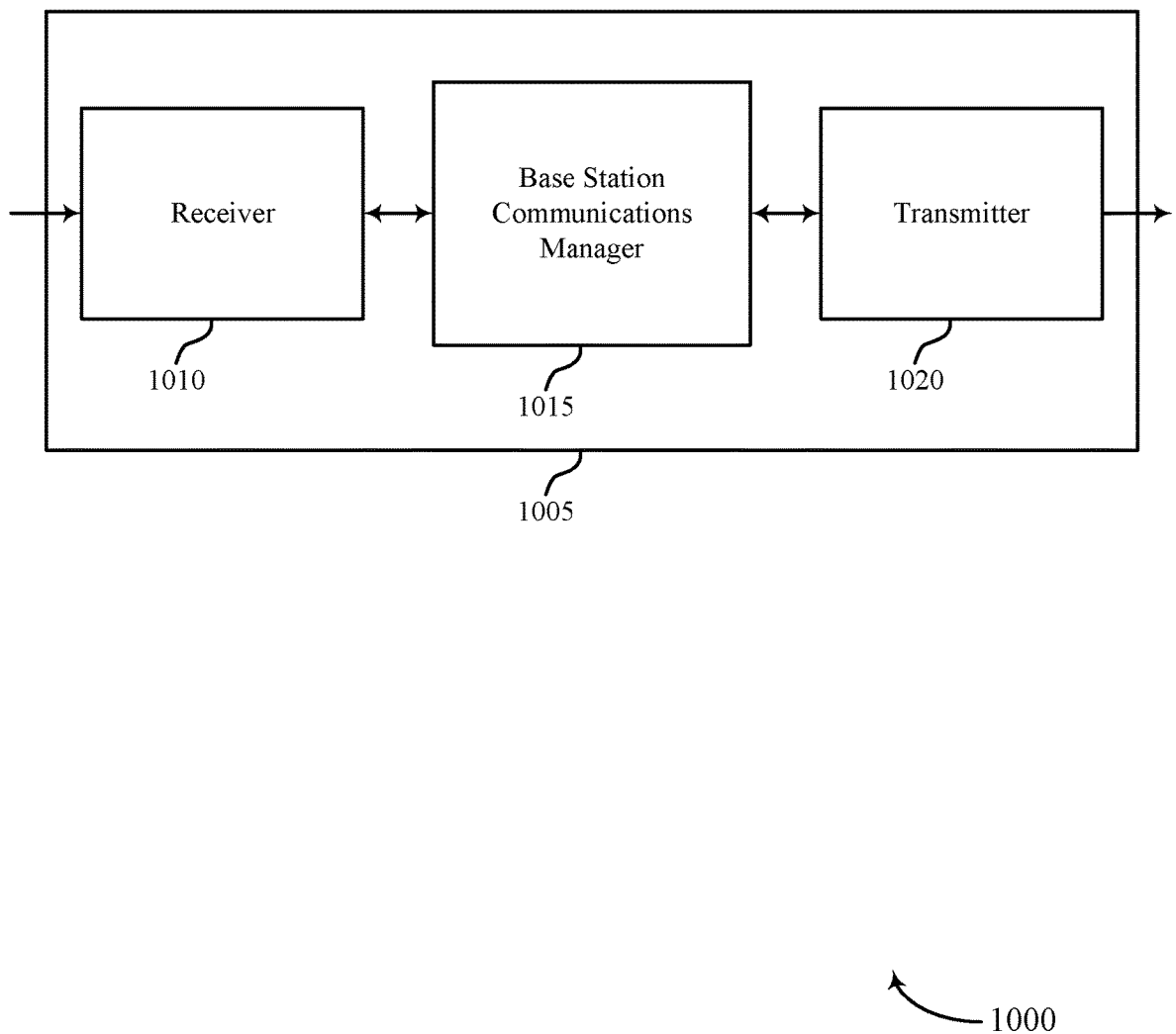
FIGS. 10 through 12 show block diagrams of a device that supports mechanisms for sidelink resource scheduling in accordance with aspects of the present disclosure.

FIG. 10 shows a block diagram 1000 of a wireless device 1005 that supports mechanisms for sidelink resource scheduling in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to mechanisms for sidelink resource scheduling, etc.). Information may be passed on to other components of the device. The receiver 1010 may be an example of aspects of the transceiver 1335 described with reference to FIG. 13. The receiver 1010 may utilize a single antenna or a set of antennas.

Receiver 1010 may receive a request from a UE for resource scheduling information to perform a vehicle-based sidelink communication based on the broadcast information, the request including an indication of a type of resources for the vehicle-based sidelink communication supported by the base station and a QoS metric associated with the vehicle-based sidelink communication, may receive, from the UE, a second request for at least one grant to perform the vehicle-based sidelink communication based on the received resource scheduling information, and may receive a BSR. Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station communications manager 1015 may transmit broadcast information to a UE that identifies types of resources for vehicle-based sidelink communications that are supported by the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Transmitter 1020 may transmit to the UE, in response to the request, a response that includes the resource scheduling information to perform the vehicle-based sidelink communication, and may transmit a second response indicating the at least one grant allocated on a set of carrier frequencies based on the type of resources indicated in the request, where transmitting the at least one grant may be further based on transmitting a DCI.

Figure 11:
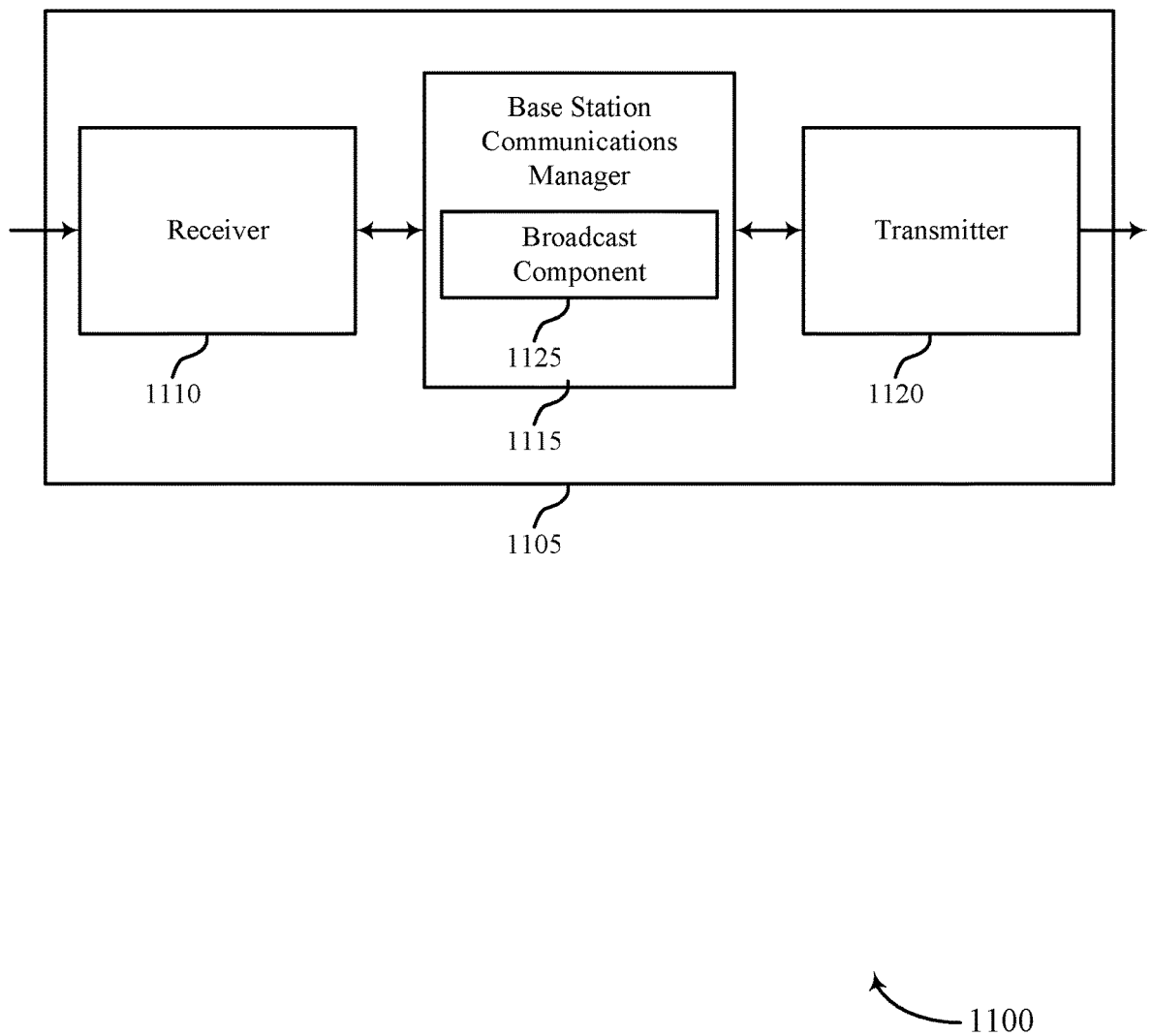

FIG. 11 shows a block diagram 1100 of a wireless device 1105 that supports mechanisms for sidelink resource scheduling in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to mechanisms for sidelink resource scheduling, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include broadcast component 1125.

Broadcast component 1125 may transmit broadcast information to a UE that identifies types of resources for vehicle-based sidelink communications that are supported by the base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
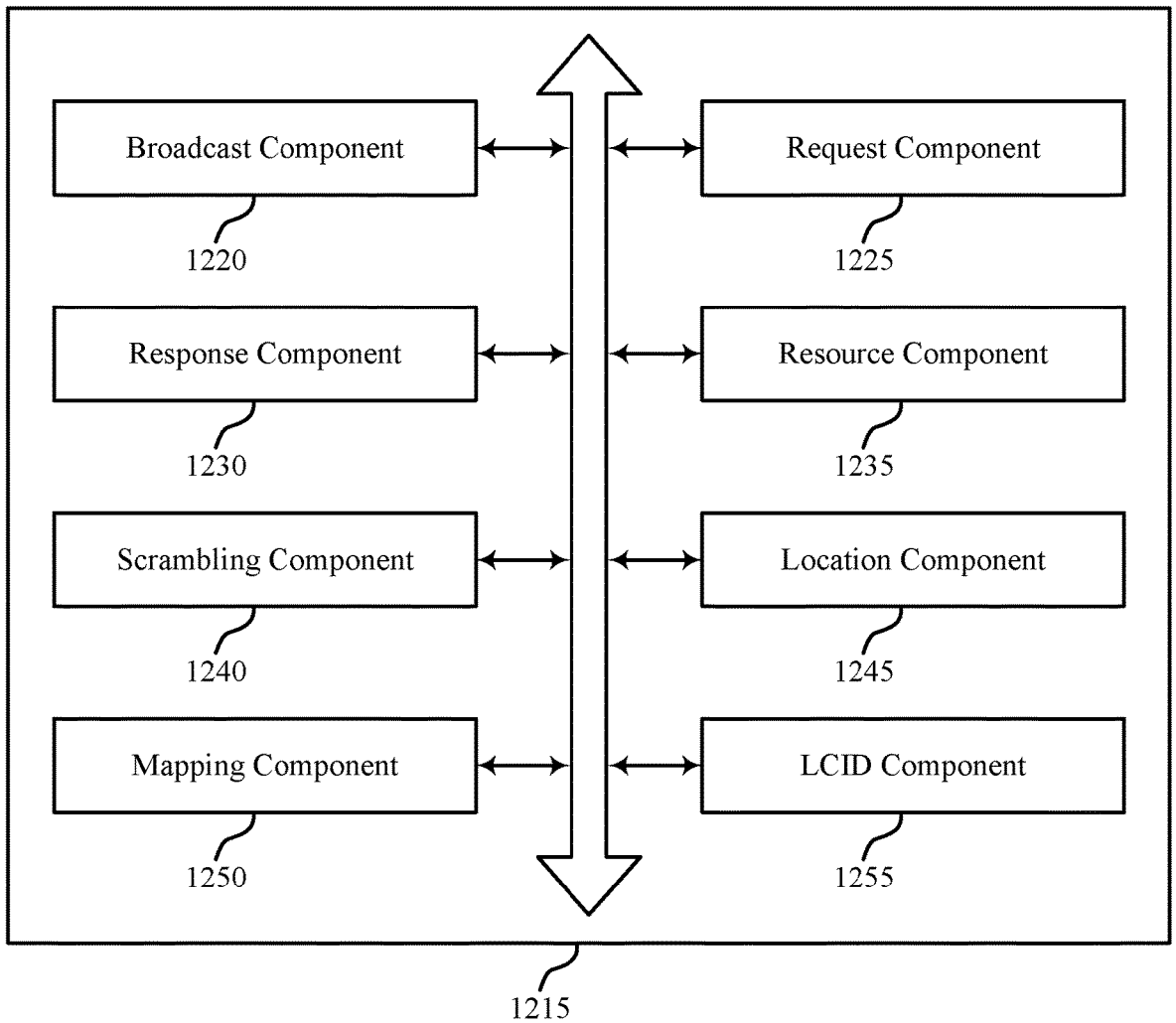

FIG. 12 shows a block diagram 1200 of a base station communications manager 1215 that supports mechanisms for sidelink resource scheduling in accordance with aspects of the present disclosure. The base station communications manager 1215 may be an example of aspects of a base station communications manager 1315 described with reference to FIGS. 10, 11, and 13. The base station communications manager 1215 may include broadcast component 1220, request component 1225, response component 1230, resource component 1235, scrambling component 1240, location component 1245, mapping component 1250, and LCID component 1255. Each of these modules may communicate, directly or indirectly, with one another (e.g., via one or more buses).

Broadcast component 1220 may transmit broadcast information to a UE that identifies types of resources for vehicle-based sidelink communications that are supported by the base station.

Request component 1225 may identify a request transmitted from the UE to the base station. In some cases, the request is included in a sidelink information message to the base station. In some cases, the request is included in an assistance information message to the base station. In some cases, the request is an RRC message.

Response component 1230 may determine a response transmitted from the base station to the UE. In some cases, the second response includes a timing associated with the at least one grant, a frequency associated with the at least one grant, a BWP associated with the at least one grant, a MCS, a CIF, or a combination thereof. In some cases, the response includes information related to a BWP associated with the vehicle-based sidelink communication, decoding information for the vehicle-based sidelink communication, a location of at least a grant associated with the vehicle-based sidelink communication, a scrambling identifier associated with the vehicle-based sidelink communication, one or more mappings associated with the requested QoS metric, or a combination thereof. In some cases, the decoding information for the vehicle-based sidelink communication includes a CORESET information. In some cases, the one or more mappings associated with the requested QoS metric include at least one of a first mapping between LCID and the requested QoS metric and a second mapping between the LCID and an LCG ID. In some cases, the response is an RRC message.

Resource component 1235 may indicate whether the at least one grant is allocated using LTE resources, NR resources, or both, based on a bit included in the DCI. In some cases, the types of resources include LTE resources, NR resources, or both. Scrambling component 1240 may indicate in the response, a scrambling identifier associated with the vehicle-based sidelink communication and scramble the at least one grant to perform the vehicle-based sidelink communication using the scrambling identifier. Location component 1245 may indicate in the response, a location indicator associated with the vehicle-based sidelink communication and determine a location of the at least one grant based on the location indicator, where the location of the at least one grant is determined in relation to a second grant associated with a downlink communication.

Mapping component 1250 may determine a mapping between an LCID and the requested QoS metric, where the response further includes an indication of the mapping. LCID component 1255 may receive an LCID in the second request, where the LCID is based on a mapping associated with the requested QoS metric indicated in the response.

Figure 13:
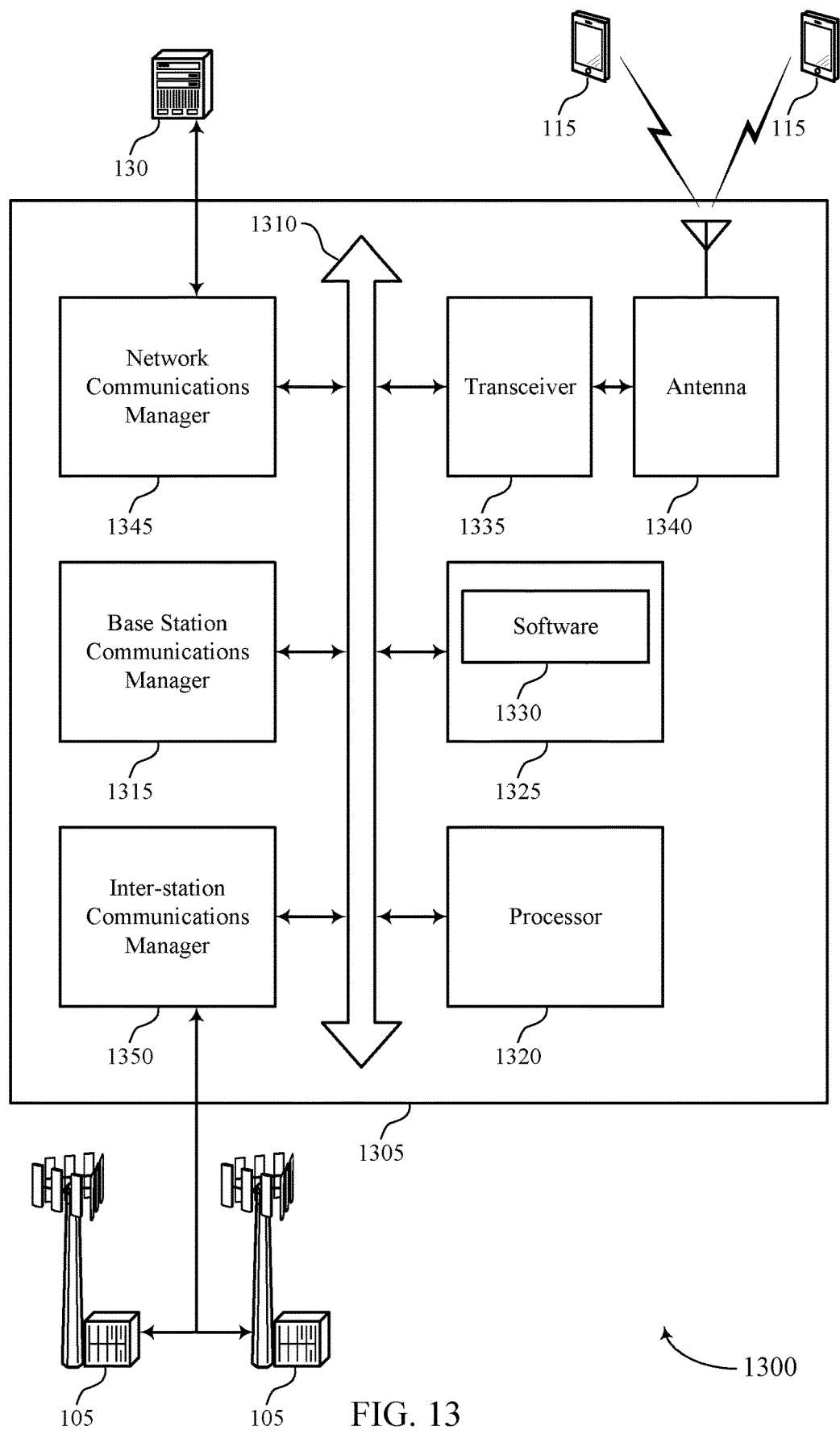
FIG. 13 illustrates a block diagram of a system including a base station that supports mechanisms for sidelink resource scheduling in accordance with aspects of the present disclosure.

FIG. 13 shows a diagram of a system 1300 including a device 1305 that supports mechanisms for sidelink resource scheduling in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting mechanisms for sidelink resource scheduling).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support mechanisms for sidelink resource scheduling. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base stations 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
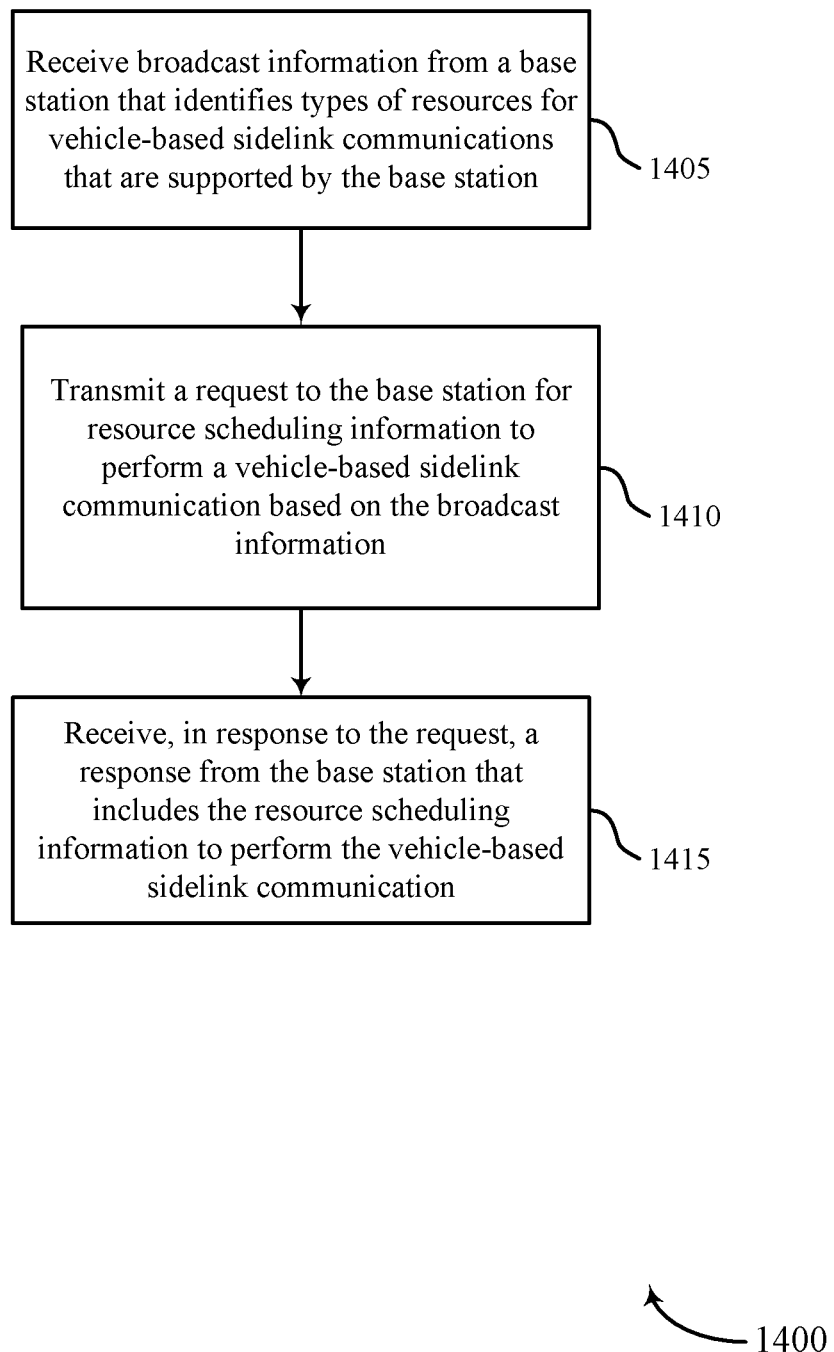
FIGS. 14 through 17 illustrate methods for mechanisms for sidelink resource scheduling in accordance with aspects of the present disclosure.

FIG. 14 shows a flowchart illustrating a method 1400 for mechanisms for sidelink resource scheduling in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive broadcast information from a base station 105 that identifies types of resources for vehicle-based sidelink communications that are supported by the base station 105. The operations of 1405 may be performed according to the methods described herein. In certain examples, aspects of the operations of 1405 may be performed by a broadcast component as described with reference to FIGS. 6 through 9.

At 1410 the UE 115 may transmit a request to the base station 105 for resource scheduling information to perform a vehicle-based sidelink communication based on the broadcast information. In some cases, the request may include an indication of a type of resources for the vehicle-based sidelink communication supported by the base station 105 and a QoS metric associated with the vehicle-based sidelink communication. The operations of 1410 may be performed according to the methods described herein. In certain examples, aspects of the operations of 1410 may be performed by a transmitter as described with reference to FIGS. 6 through 9.

At 1415 the UE 115 may receive, in response to the request, a response from the base station 105 that includes the resource scheduling information to perform the vehicle-based sidelink communication. The operations of 1415 may be performed according to the methods described herein. In certain examples, aspects of the operations of 1415 may be performed by a receiver as described with reference to FIGS. 6 through 9.

Figure 15:
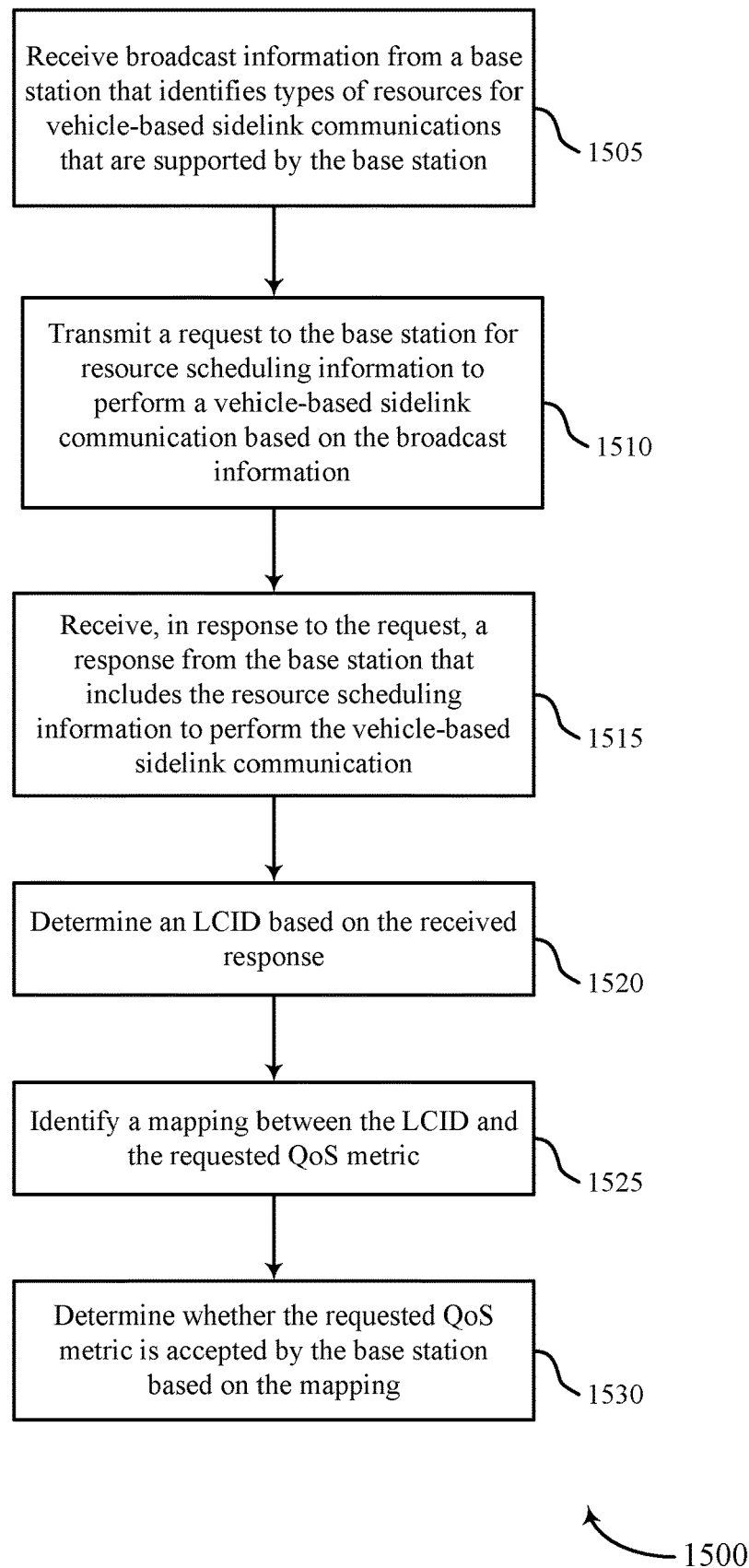

FIG. 15 shows a flowchart illustrating a method 1500 for mechanisms for sidelink resource scheduling in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive broadcast information from a base station 105 that identifies types of resources for vehicle-based sidelink communications that are supported by the base station 105. The operations of 1505 may be performed according to the methods described herein. In certain examples, aspects of the operations of 1505 may be performed by a broadcast component as described with reference to FIGS. 6 through 9.

At 1510 the UE 115 may transmit a request to the base station 105 for resource scheduling information to perform a vehicle-based sidelink communication based on the broadcast information. In some cases, the request may include an indication of a type of resources for the vehicle-based sidelink communication supported by the base station 105 and a QoS metric associated with the vehicle-based sidelink communication. The operations of 1510 may be performed according to the methods described herein. In certain examples, aspects of the operations of 1510 may be performed by a transmitter as described with reference to FIGS. 6 through 9.

At 1515 the UE 115 may receive, in response to the request, a response from the base station 105 that includes the resource scheduling information to perform the vehicle-based sidelink communication. The operations of 1515 may be performed according to the methods described herein. In certain examples, aspects of the operations of 1515 may be performed by a receiver as described with reference to FIGS. 6 through 9.

At 1520 the UE 115 may determine an LCID based on the received response. The operations of 1520 may be performed according to the methods described herein. In certain examples, aspects of the operations of 1520 may be performed by a LCID component as described with reference to FIGS. 6 through 9.

At 1525 the UE 115 may identify a mapping between the LCID and the requested QoS metric. The operations of 1525 may be performed according to the methods described herein. In certain examples, aspects of the operations of 1525 may be performed by a mapping component as described with reference to FIGS. 6 through 9.

At 1530 the UE 115 may determine whether the requested QoS metric is accepted by the base station based on the mapping. The operations of 1530 may be performed according to the methods described herein. In certain examples, aspects of the operations of 1530 may be performed by a QoS metric component as described with reference to FIGS. 6 through 9.

Figure 16:
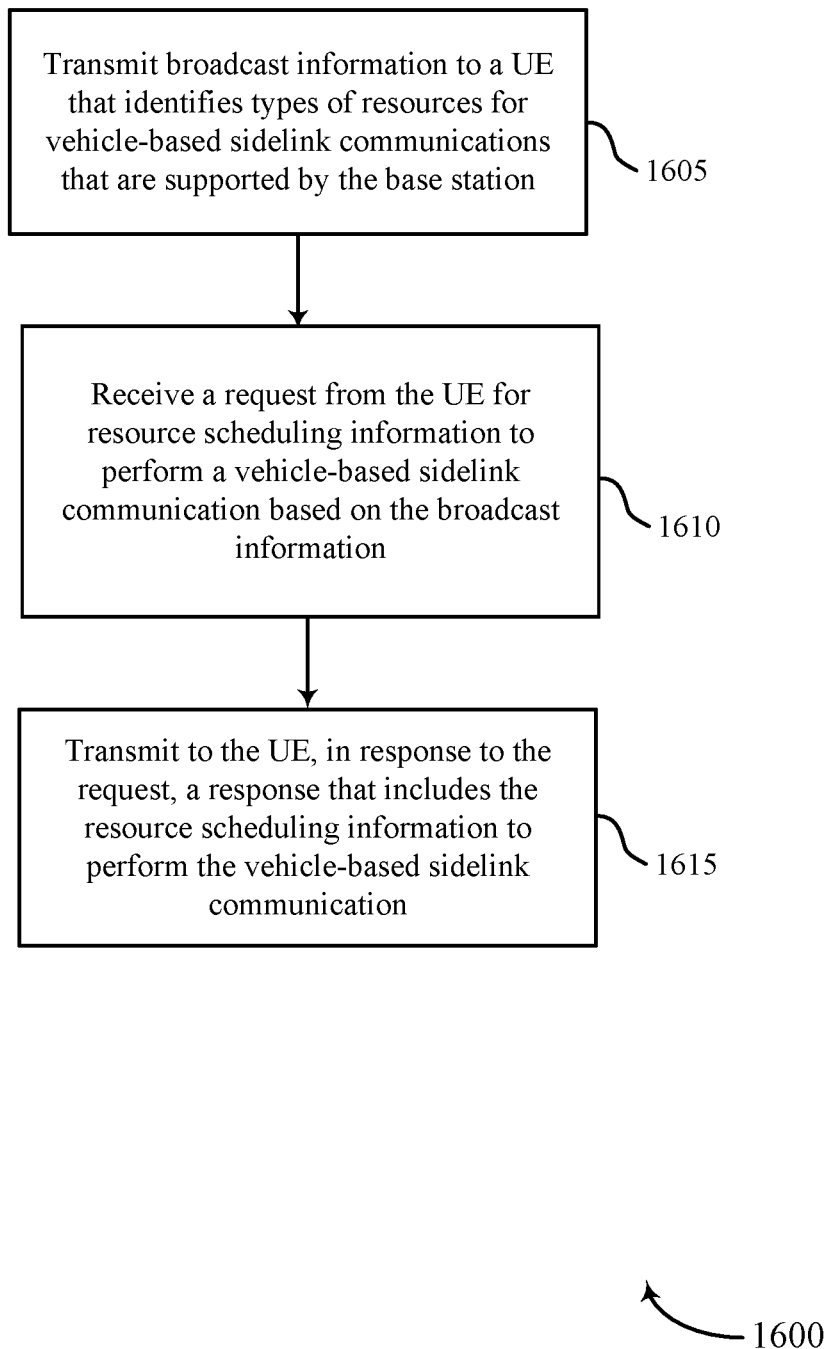

FIG. 16 shows a flowchart illustrating a method 1600 for mechanisms for sidelink resource scheduling in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit broadcast information to a UE 115 that identifies types of resources for vehicle-based sidelink communications that are supported by the base station. The operations of 1605 may be performed according to the methods described herein. In certain examples, aspects of the operations of 1605 may be performed by a broadcast component as described with reference to FIGS. 10 through 13.

At 1610 the base station 105 may receive a request from the UE 115 for resource scheduling information to perform a vehicle-based sidelink communication based on the broadcast information. In some cases, the request may include an indication of a type of resources for the vehicle-based sidelink communication supported by the base station and a QoS metric associated with the vehicle-based sidelink communication. The operations of 1610 may be performed according to the methods described herein. In certain examples, aspects of the operations of 1610 may be performed by a receiver as described with reference to FIGS. 10 through 13.

At 1615 the base station 105 may transmit to the UE 115, in response to the request, a response that includes the resource scheduling information to perform the vehicle-based sidelink communication. The operations of 1615 may be performed according to the methods described herein. In certain examples, aspects of the operations of 1615 may be performed by a transmitter as described with reference to FIGS. 10 through 13.

Figure 17:
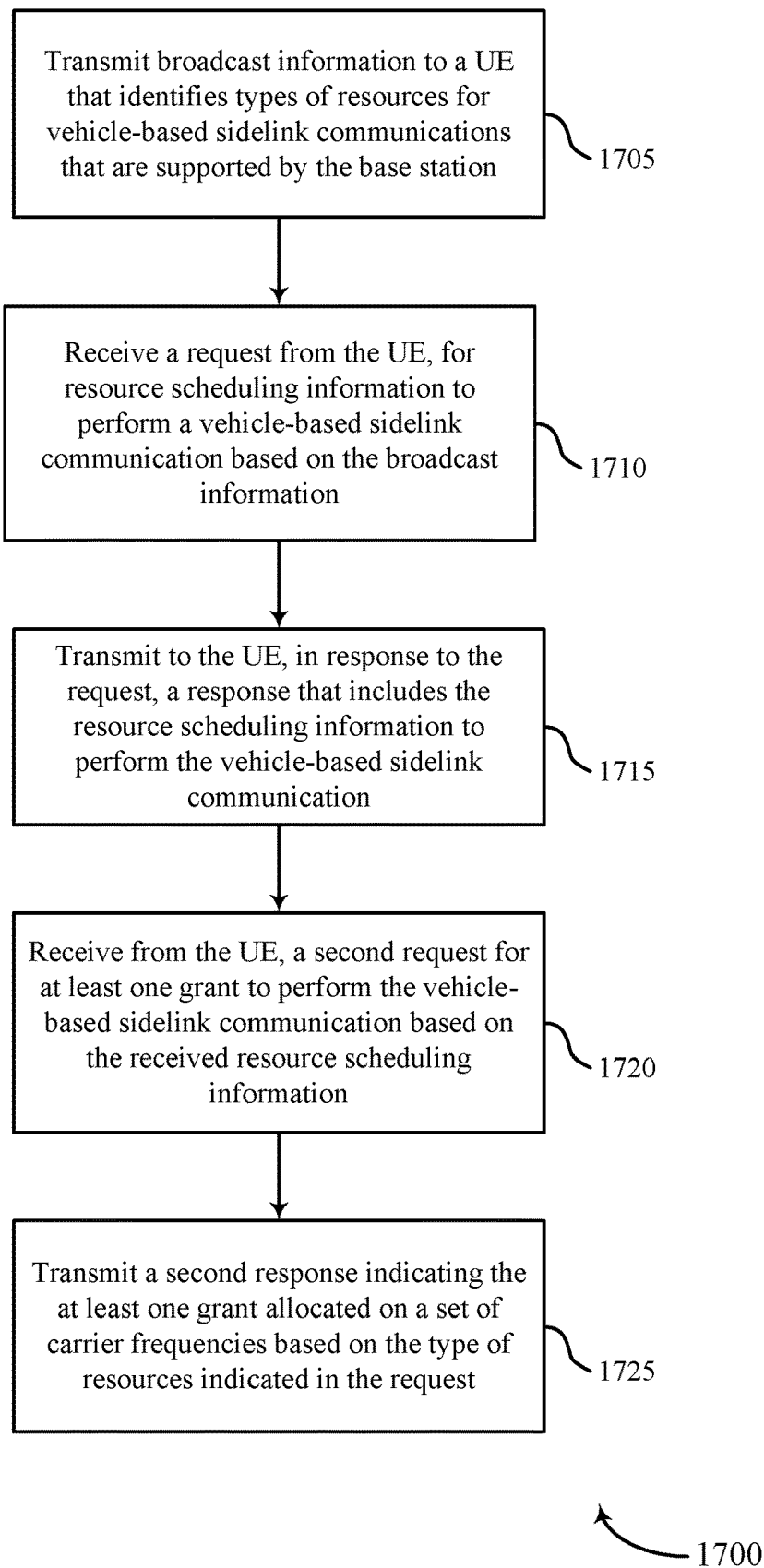

FIG. 17 shows a flowchart illustrating a method 1700 for mechanisms for sidelink resource scheduling in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit broadcast information to a UE 115 that identifies types of resources for vehicle-based sidelink communications that are supported by the base station. The operations of 1705 may be performed according to the methods described herein. In certain examples, aspects of the operations of 1705 may be performed by a broadcast component as described with reference to FIGS. 10 through 13.

At 1710 the base station 105 may receive a request from the UE 115, for resource scheduling information to perform a vehicle-based sidelink communication based on the broadcast information. In some cases, the request may include an indication of a type of resources for the vehicle-based sidelink communication supported by the base station 105 and a QoS metric associated with the vehicle-based sidelink communication. The operations of 1710 may be performed according to the methods described herein. In certain examples, aspects of the operations of 1710 may be performed by a receiver as described with reference to FIGS. 10 through 13.

At 1715 the base station 105 may transmit to the UE 115, in response to the request, a response that includes the resource scheduling information to perform the vehicle-based sidelink communication. The operations of 1715 may be performed according to the methods described herein. In certain examples, aspects of the operations of 1715 may be performed by a transmitter as described with reference to FIGS. 10 through 13.

At 1720 the base station 105 may receive from the UE 115, a second request for at least one grant to perform the vehicle-based sidelink communication based on the resource scheduling information. The operations of 1720 may be performed according to the methods described herein. In certain examples, aspects of the operations of 1720 may be performed by a receiver as described with reference to FIGS. 10 through 13.

At 1725 the base station 105 may transmit a second response indicating the at least one grant allocated on a set of carrier frequencies based on the type of resources indicated in the request. The operations of 1725 may be performed according to the methods described herein. In certain examples, aspects of the operations of 1725 may be performed by a transmitter as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving broadcast information from a base station that identifies one or more types of radio access technologies for which corresponding resources for vehicle-based sidelink communications are supported by the base station;
   transmitting a request to the base station for resource scheduling information to perform a vehicle-based sidelink communication based at least in part on the identified one or more types of radio access technologies, the request comprising an indication of a type of resources associated with a corresponding radio access technology for the vehicle-based sidelink communication supported by the base station and a quality of service (QoS) metric associated with the vehicle-based sidelink communication; and
   receiving, in response to the request, a response from the base station that comprises the resource scheduling information to perform the vehicle-based sidelink communication.

2. The method of claim 1, further comprising:
   determining a logical channel ID (LCID) based at least in part on the received response;
   identifying a mapping between the LCID and the requested QoS metric; and
   determining whether the requested QoS metric is accepted by the base station based at least in part on the mapping.

3. The method of claim 1, further comprising:
   transmitting a second request for at least one grant from the base station to perform the vehicle-based sidelink communication based at least in part on the received resource scheduling information; and
   receiving a second response indicating the at least one grant allocated on a set of carrier frequencies from the base station based at least in part on the type of resources indicated in the request.

4. The method of claim 3, wherein requesting the at least one grant further comprises transmitting a Buffer Status Report (BSR) to the base station.

5. The method of claim 3, further comprising:
determining a logical channel ID (LCID) based at least in part on a mapping associated with the requested QoS metric, wherein the mapping is indicated in the response; and
including the LCID in the second request for the at least one grant.

6. The method of claim 3, further comprising:
receiving the at least one grant based at least in part on receiving a Downlink Control Indicator (DCI); and
determining whether the at least one grant is allocated using Long Term Evolution (LTE) resources, New Radio (NR) resources, or both, based at least in part on a bit included in the DCI.

7. The method of claim 3, further comprising:
determining a scrambling identifier associated with the vehicle-based sidelink communication based at least in part on the response; and
identifying the at least one grant to perform the vehicle-based sidelink communication based at least in part on determining that the at least one grant is scrambled using the scrambling identifier.

8. The method of claim 3, wherein the second response comprises a timing associated with the at least one grant, a frequency associated with the at least one grant, a Bandwidth Part (BWP) associated with the at least one grant, a Modulation and Coding Scheme (MCS), a Carrier Indicator Field (CIF), or a combination thereof.

9. The method of claim 1, wherein the response comprises information related to a Bandwidth Part (BWP) associated with the vehicle-based sidelink communication, decoding information for the vehicle-based sidelink communication comprising a Control Resource Set (CORESET) information, a location of at least a grant associated with the vehicle-based sidelink communication, a scrambling identifier associated with the vehicle-based sidelink communication, one or more mappings associated with the requested QoS metric, or a combination thereof.

10. The method of claim 9, wherein the one or more mappings associated with the requested QoS metric comprise at least one of a first mapping between logical channel ID (LCID) and the requested QoS metric and a second mapping between the LCID and a logical channel group (LCG) ID.

11. The method of claim 1, wherein the one or more types of resources comprise LTE resources, NR resources or both.

12. The method of claim 1, wherein the request is included in a sidelink information message to the base station.

13. The method of claim 1, wherein the request is included in an assistance information message to the base station.

14. The method of claim 1, wherein the request or the response is a Radio Resource Control (RRC) message.

15. A method for wireless communication at a base station, comprising:
transmitting broadcast information to a user equipment (UE) that identifies one or more types of radio access technologies for which corresponding resources for vehicle-based sidelink communications are supported by the base station;
receiving a request from the UE for resource scheduling information to perform a vehicle-based sidelink communication based at least in part on the identified one or more types of radio access technologies, the request comprising an indication of a type of resources associated with a corresponding radio access technology for the vehicle-based sidelink communication supported by the base station and a quality of service (QoS) metric associated with the vehicle-based sidelink communication; and
transmitting to the UE, in response to the request, a response that comprises the resource scheduling information to perform the vehicle-based sidelink communication.

16. The method of claim 15, further comprising:
determining a mapping between a logical channel ID (LCID) and the requested QoS metric, wherein the response further comprises an indication of the mapping.

17. The method of claim 15, further comprising:
receiving from the UE, a second request for at least one grant to perform the vehicle-based sidelink communication based at least in part on the received resource scheduling information; and
transmitting a second response indicating the at least one grant allocated on a set of carrier frequencies based at least in part on the type of resources indicated in the request.

18. The method of claim 17, wherein receiving the second request for the at least one grant further comprises receiving a Buffer Status Report (BSR).

19. The method of claim 17, further comprising:
receiving a logical channel ID (LCID) in the second request, wherein the LCID is based at least in part on a mapping associated with the requested QoS metric indicated in the response.

20. The method of claim 17, further comprising:
transmitting the at least one grant based at least in part on transmitting a Downlink Control Indicator (DCI); and
indicating whether the at least one grant is allocated using Long Term Evolution (LTE) resources, New Radio (NR) resources, or both, based at least in part on a bit included in the DCI.

21. The method of claim 17, further comprising:
indicating in the response, a scrambling identifier associated with the vehicle-based sidelink communication; and
scrambling the at least one grant to perform the vehicle-based sidelink communication using the scrambling identifier.

22. The method of claim 17, wherein the second response comprises a timing associated with the at least one grant, a frequency associated with the at least one grant, a Bandwidth Part (BWP) associated with the at least one grant, a Modulation and Coding Scheme (MCS), a Carrier Indicator Field (CIF), or a combination thereof.

23. The method of claim 15, wherein the response comprises information related to a Bandwidth Part (BWP) associated with the vehicle-based sidelink communication, decoding information for the vehicle-based sidelink communication comprising a Control Resource Set (CORESET) information, a location of at least a grant associated with the vehicle-based sidelink communication, a scrambling identifier associated with the vehicle-based sidelink communication, one or more mappings associated with the requested QoS metric, or a combination thereof.

24. The method of claim 23, wherein the one or more mappings associated with the requested QoS metric comprise at least one of a first mapping between logical channel ID (LCID) and the requested QoS metric and a second mapping between the LCID and a logical channel group (LCG) ID.

25. The method of claim 15, wherein the one or more types of resources comprise LTE resources, NR resources or both.

26. The method of claim 15, wherein the request is included in a sidelink information message to the base station.

27. The method of claim 15, wherein the request is included in an assistance information message to the base station.

28. The method of claim 15, wherein the request or the response is a Radio Resource Control (RRC) message.

29. An apparatus for wireless communication, comprising:

a processor;

memory coupled with the processor; and instructions stored in the memory and executable by the processor to cause the apparatus to:

receive broadcast information from a base station that identifies one or more types of radio access technologies for which corresponding resources for vehicle-based sidelink communications are supported by the base station;

transmit a request to the base station for resource scheduling information to perform a vehicle-based sidelink communication based at least in part on the identified one or more types of radio access technologies, the request comprising an indication of a type of resources associated with a corresponding radio access technology for the vehicle-based sidelink communication supported by the base station and a quality of service (QoS) metric associated with the vehicle-based sidelink communication; and receive, in response to the request, a response from the base station that comprises the resource scheduling information to perform the vehicle-based sidelink communication.

30. An apparatus for wireless communication, comprising:

a processor;

memory coupled with the processor; and instructions stored in the memory and executable by the processor to cause the apparatus to:

transmit broadcast information to a user equipment (UE) that identifies one or more types of radio access technologies for which corresponding resources for vehicle-based sidelink communications are supported by the base station;

receive a request from the UE for resource scheduling information to perform a vehicle-based sidelink communication based at least in part on the identified one or more types of radio access technologies, the request comprising an indication of a type of resources associated with a corresponding radio access technology for the vehicle-based sidelink communication supported by the base station and a quality of service (QoS) metric associated with the vehicle-based sidelink communication; and transmit to the UE, in response to the request, a response that comprises the resource scheduling information to perform the vehicle-based sidelink communication.

\* \* \* \* \*